(12) United States Patent
Vigneron et al.

(10) Patent No.: US 7,324,584 B1
(45) Date of Patent: *Jan. 29, 2008

(54) LOW COMPLEXITY INTERFERENCE CANCELLATION

(75) Inventors: Philip Julius Vigneron, Kanata (CA); Jason Robert Duggan, Nepean (CA); Hua Xu, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 690 days.

This patent is subject to a terminal disclaimer.

(21) Appl. No.: 10/355,837

(22) Filed: Jan. 31, 2003

Related U.S. Application Data

(60) Provisional application No. 60/353,942, filed on Jan. 31, 2002, provisional application No. 60/353,728, filed on Jan. 31, 2002.

(51) Int. Cl.
 *H04B 1/00* (2006.01)
(52) U.S. Cl. ...................................... 375/150; 375/144
(58) Field of Classification Search ................ 375/148, 375/142, 144, 147, 150
See application file for complete search history.

(56) References Cited

U.S. PATENT DOCUMENTS

| | | | | |
|---|---|---|---|---|
| 4,349,915 A | | 9/1982 | Costas | 375/40 |
| 5,493,307 A | * | 2/1996 | Tsujimoto | 342/380 |
| 5,537,443 A | * | 7/1996 | Yoshino et al. | 375/340 |
| 5,550,810 A | * | 8/1996 | Monogioudis et al. | 370/342 |
| 5,644,592 A | | 7/1997 | Divsalar et al. | 375/206 |
| 5,982,763 A | * | 11/1999 | Sato | 370/342 |
| 6,014,373 A | | 1/2000 | Schilling et al. | 370/342 |
| 6,154,443 A | * | 11/2000 | Huang et al. | 370/210 |
| 6,647,077 B1 | * | 11/2003 | Shan et al. | 375/346 |
| 2002/0015438 A1 | * | 2/2002 | Ishizu et al. | 375/147 |

OTHER PUBLICATIONS

Co-Pending U.S. Appl. No. 10/355,783.*
Fuller, Arthur et al., "3GTDD Feasibility," RF Head Study Report, Nortel Networks dabtd005—Issue BJM v0.1, Sep. 28, 2001.
Moshavi, Shimon, "Multi-User Detection for DS-CDMA Communications," IEEE Communications Magazine, pp. 124-136, Oct. 1996.
Xue, Guoqiang et al., "Adaptive Multistage Parallel Interference Cancellation for CDMA," IEEE Journal on Selected Areas in Communications, vol. 17, No. 10, pp. 1815-1827, Oct. 1999.

* cited by examiner

*Primary Examiner*—David B. Lugo
(74) *Attorney, Agent, or Firm*—Withrow & Terranova, PLLC

(57) ABSTRACT

The present invention relates to a new parallel interference cancellation (PIC) configuration where the PIC is implemented after the rake reception and multipath combining. In the invention disclosed, the regenerated interference contributions (functions of signature sequence cross-correlations) for multiuser detection (MUD) in a multipath radio channel are explicitly filtered through the estimated multipath channels, and stored. These stored quantities already contain the effect of the channel, and only need updating according to the rate of change of channel dynamics, and not the symbol period. During each symbol period, interference is computed from each interfering user to each desired user using current estimates of symbol decisions and the aforementioned interference contributions. The precomputation of the interference contributions, which are valid for a sequence of symbols, allows for extremely low complexity baseband processing in the receiver.

32 Claims, 25 Drawing Sheets

LOW COMPLEXITY INTERFERENCE CANCELLATION

REFERENCE TO RELATED APPLICATIONS

This application claims the benefit of provisional application Ser. No. 60/353,728, filed Jan. 31, 2002, and provisional application Ser. No. 60/353,942, filed Jan. 31, 2002, the disclosures of which are incorporated herein by reference in their entireties. This application is related to a concurrently filed utility application entitled ENHANCED PARALLEL INTERFERENCE CANCELLATION, the disclosure of which is incorporated herein by reference in its entirety.

FIELD OF THE INVENTION

The present invention relates to wireless communications, and in particular to enhancing parallel interference cancellation.

BACKGROUND OF THE INVENTION

In code-division multiple access (CDMA) systems, multiple access interference (MAI) is a factor that contributes to a limitation in system capacity and performance. In an attempt to reduce the effect of this factor, one can employ some form of multi-user detection (MUD) algorithm. The basis of a typical MUD algorithm is the application of information known about other users to improve detection of each individual user. Of particular interest is the class of MUD algorithms known as subtractive interference cancellation detectors. The fundamental principle behind these detectors is that an estimate is made of each individual user's contribution to the total MAI and then subtracted out from the received signal such that the MAI affecting each individual user is reduced.

If the estimation and subtraction of the MAI occurs in parallel for each user, the resulting detector is known as a parallel interference cancellation (PIC) detector. Typically, the detection process is carried out in an iterative manner, where the data decisions of the previous iteration are used as the basis for the next iteration's MAI estimates. In general, the reliability of these data decisions improves as the number of iterations increases. In a conventional PIC detector, each cancellation iteration involves an attempt to cancel out all or a portion of the MAI. For each individual user, this is accomplished by directly subtracting out the MAI estimates for all the other users.

As the number of users in a particular communication environment increases, and the data rates increase, the complexity associated with parallel interference cancellation significantly increases. As such, there is a need for a way to provide parallel interference cancellation in an effective and efficient manner, which reduces the complexities of previous parallel interference cancellation architectures.

SUMMARY OF THE INVENTION

The present invention relates to a new parallel interference cancellation (PIC) technique. For a number of incoming symbols or a signal segment including a number of incoming signals, interference contributions, which are independent of incoming data, are calculated based on the cross-correlations of signature sequences of the given user and the corresponding interfering users for each multipath signal and channel estimates corresponding thereto. Cross-correlations are calculated based on the channel delays for each of the respective multipath signals. During PIC, the interference contributions already contain the effect of the channel, and only need updating according to the rate of change of channel dynamics, and not the symbol period. Interference is computed from each interfering user to each given user using current estimates of symbol decisions and the aforementioned interference contributions. The precomputation of the interference contributions, which are valid for a sequence of symbols or signals, allows for extremely low complexity baseband processing in the receiver.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 10:
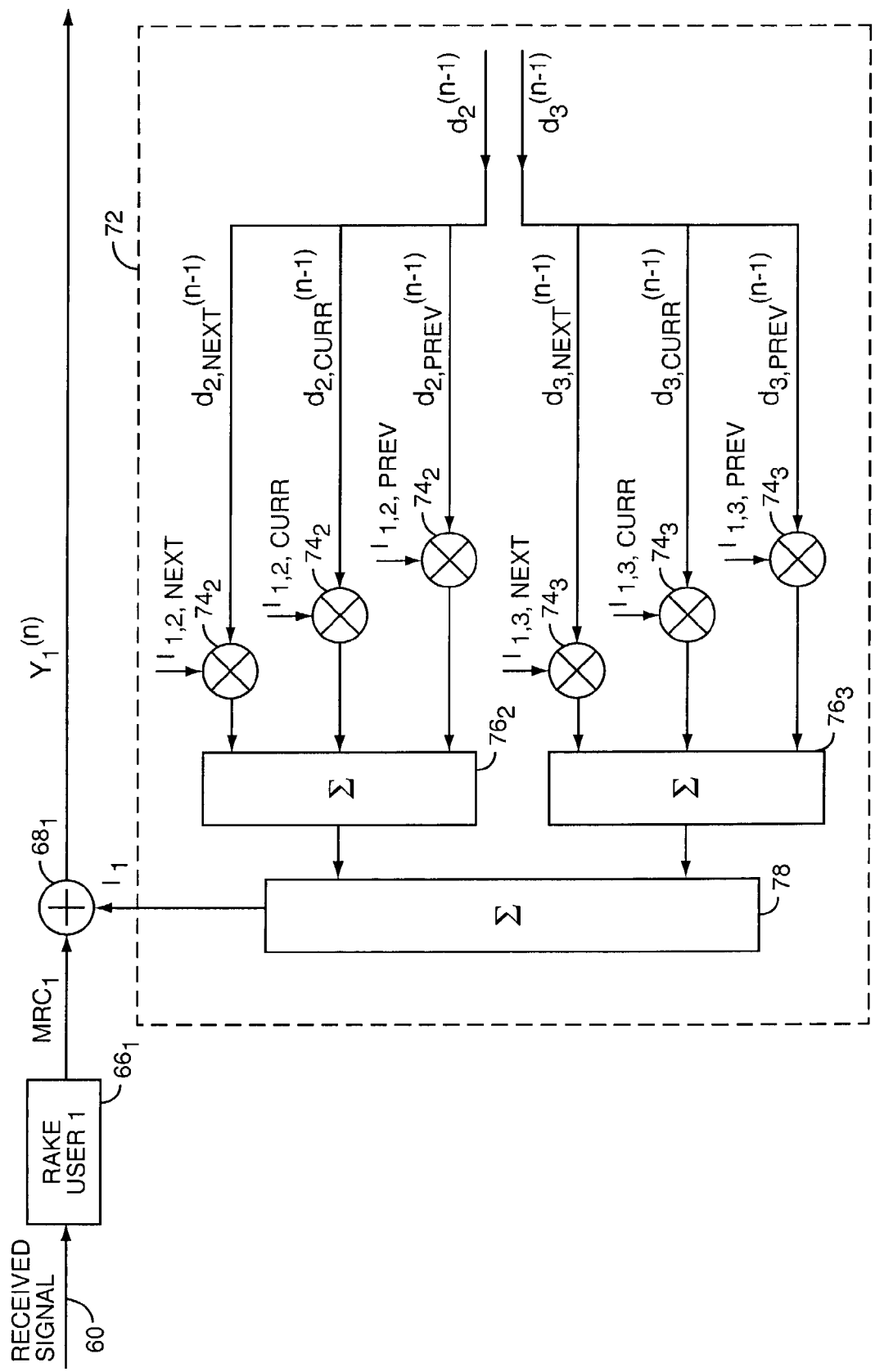

FIG. 10 provides a functional block diagram for the regeneration of interference to a given user in a symbol rate parallel interference cancellation architecture according to one embodiment of the present invention.

Figure 11:
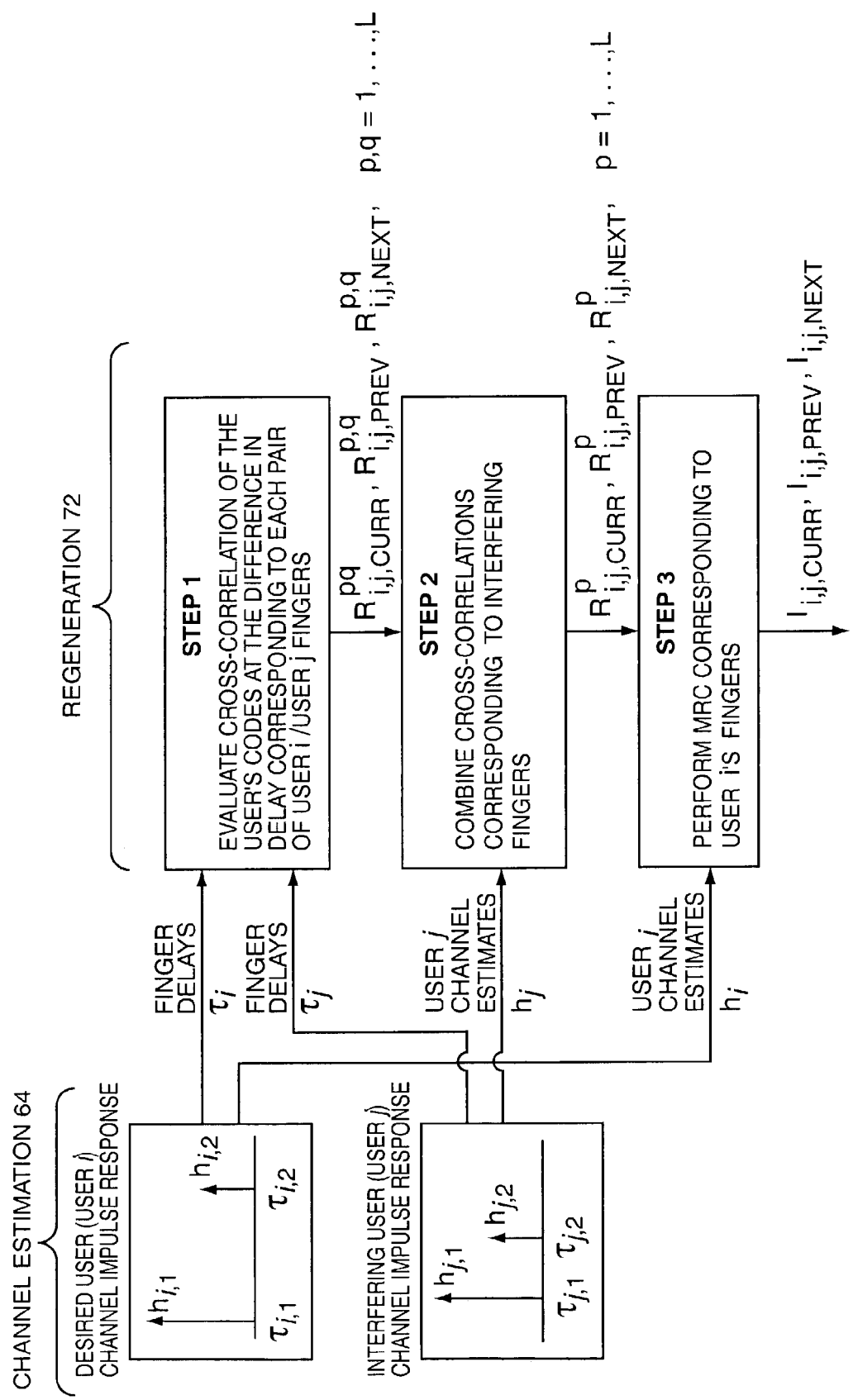

FIG. 11 is a functional block diagram illustrating how interference contribution terms are calculated according to one embodiment of the present invention.

Figure 11A:
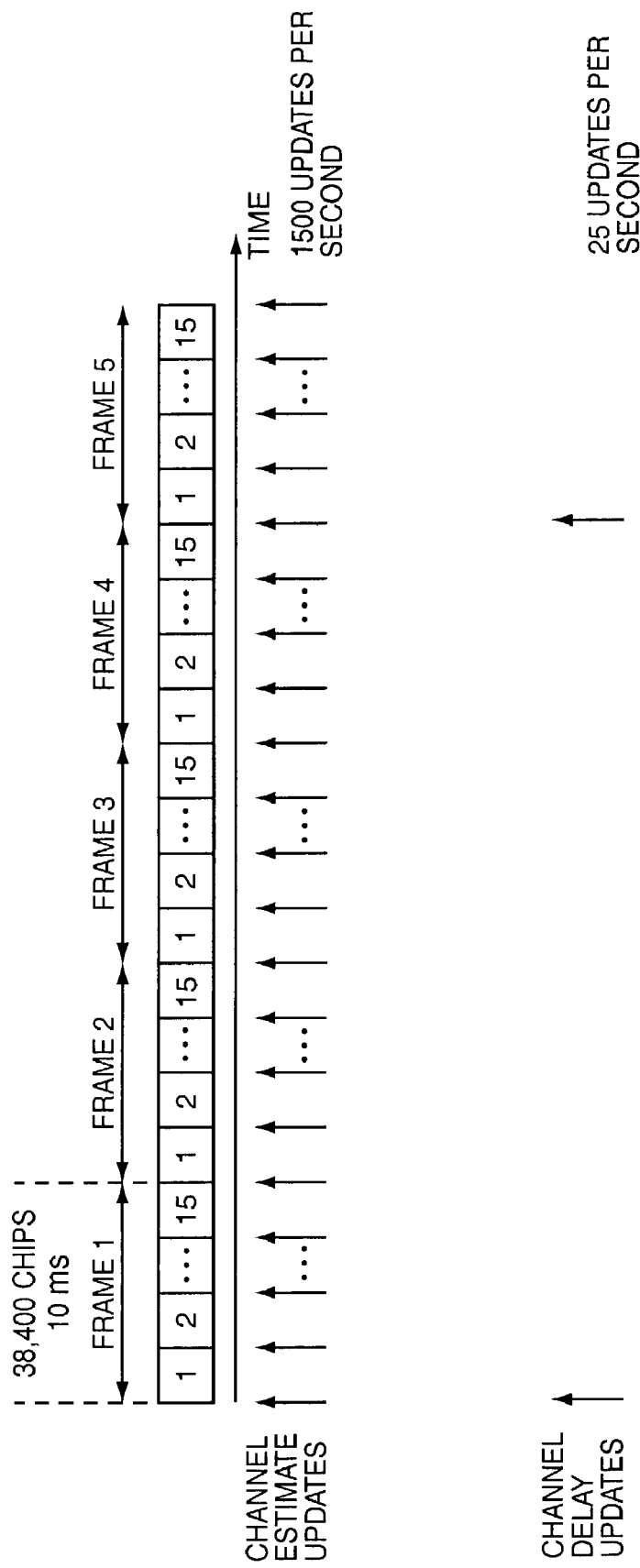

FIG. 11A illustrates the different rates at which channel delays and channel estimates are updated according to one embodiment of the present invention.

FIGS. 11B-11I illustrate the effect of channel delays on cross-correlations between select and interfering users according to multiple embodiments of the present invention.

Figure 12:
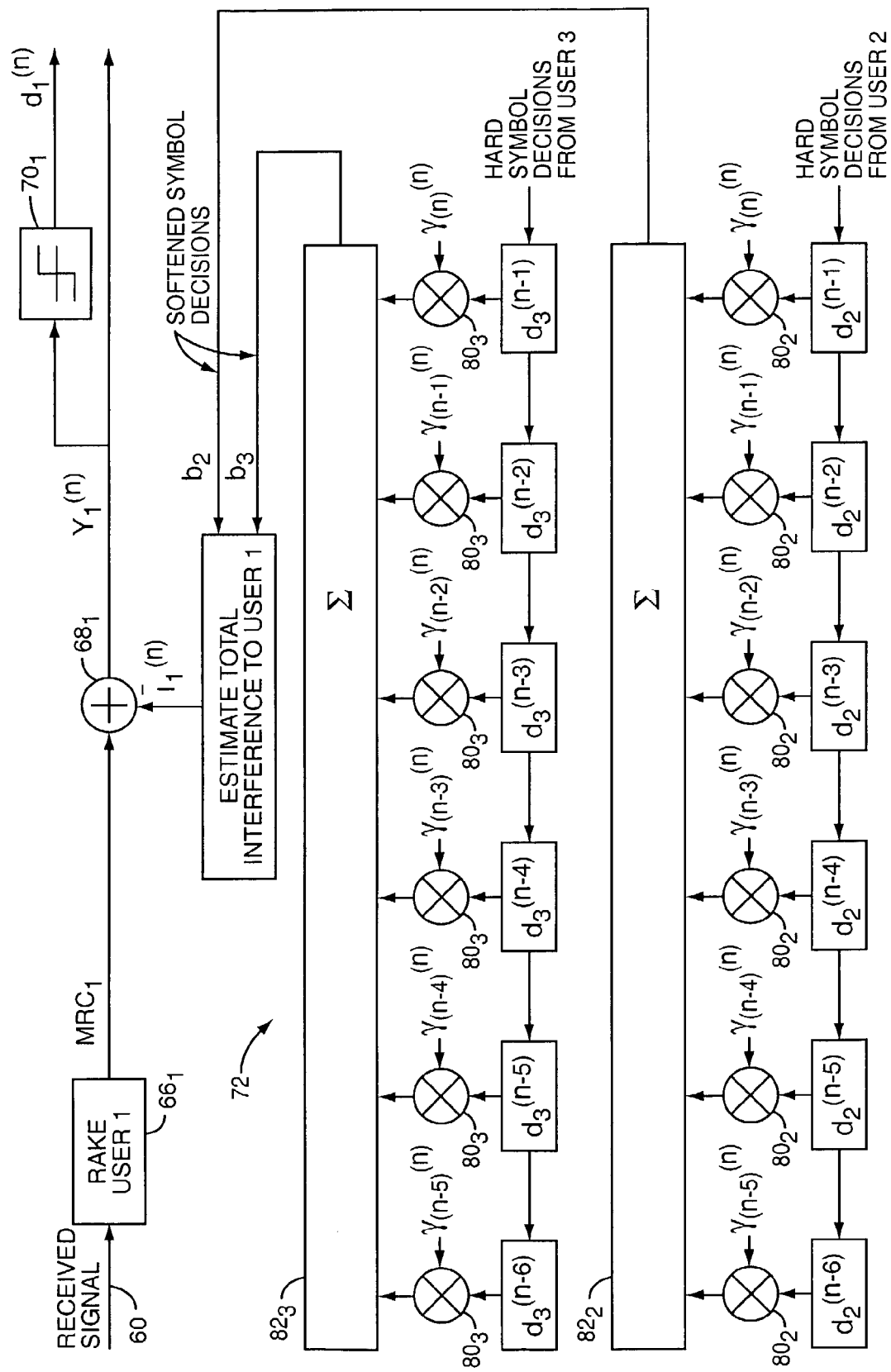

FIG. 12 is a functional block diagram illustrating inter-stage combining in a symbol rate parallel interference cancellation architecture according to a first embodiment of the present invention.

Figure 13:
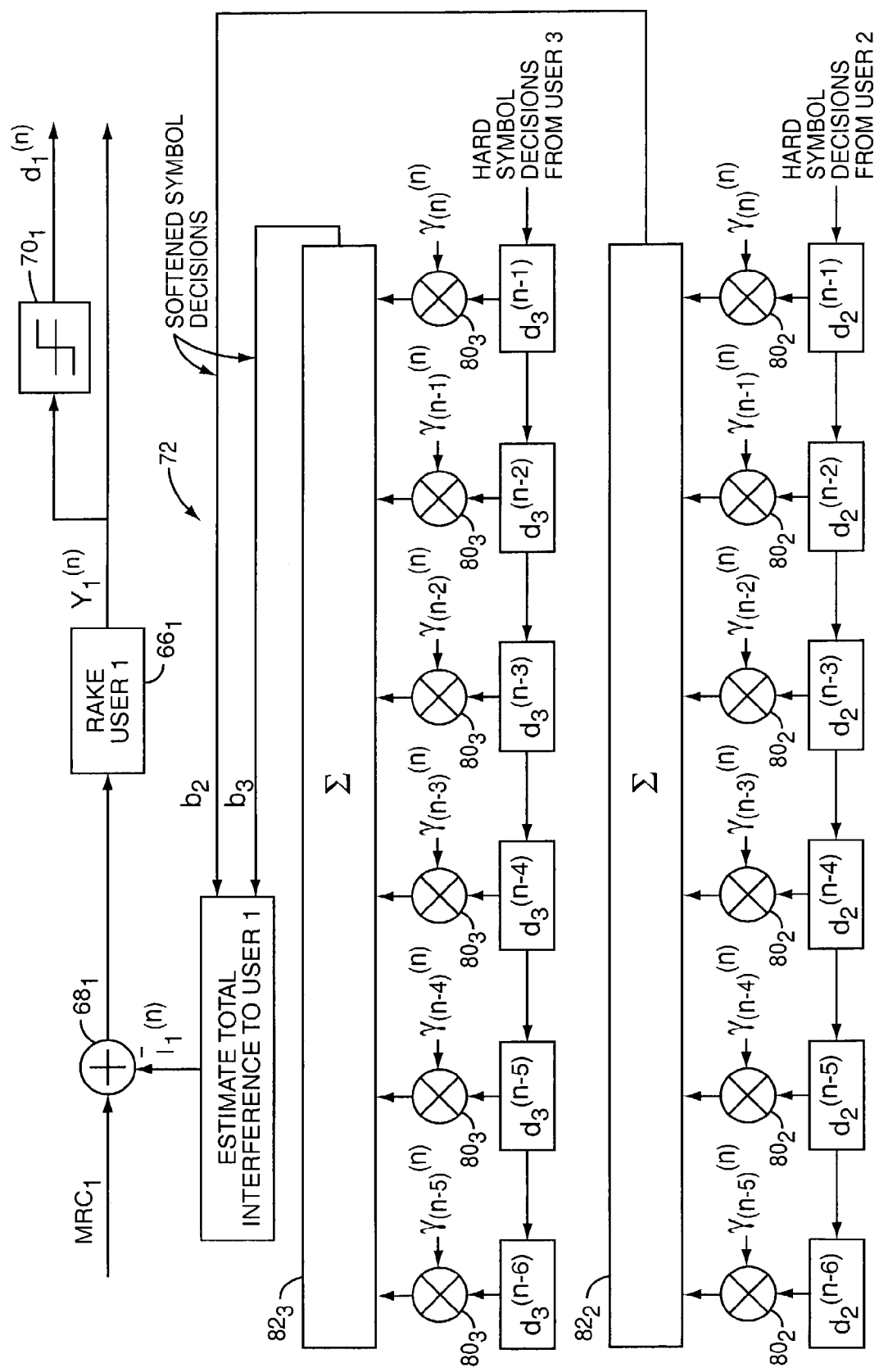

FIG. 13 is a functional block diagram illustrating inter-stage combining in a chip rate parallel interference cancellation architecture according to a first embodiment of the present invention.

Figure 14:
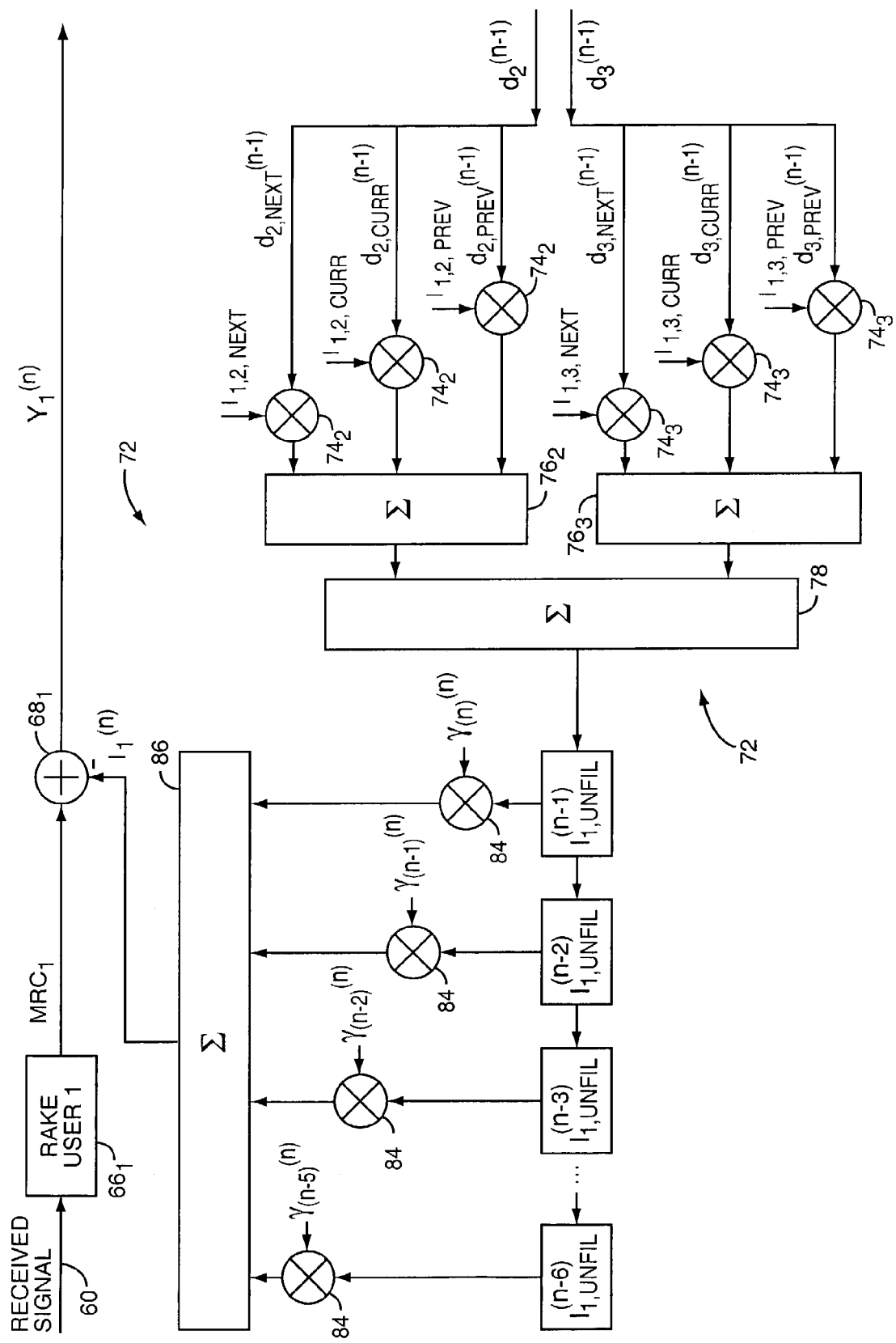

FIG. 14 is a functional block diagram illustrating inter-stage combining in a symbol rate parallel interference cancellation architecture according to a second embodiment of the present invention.

Figure 15:
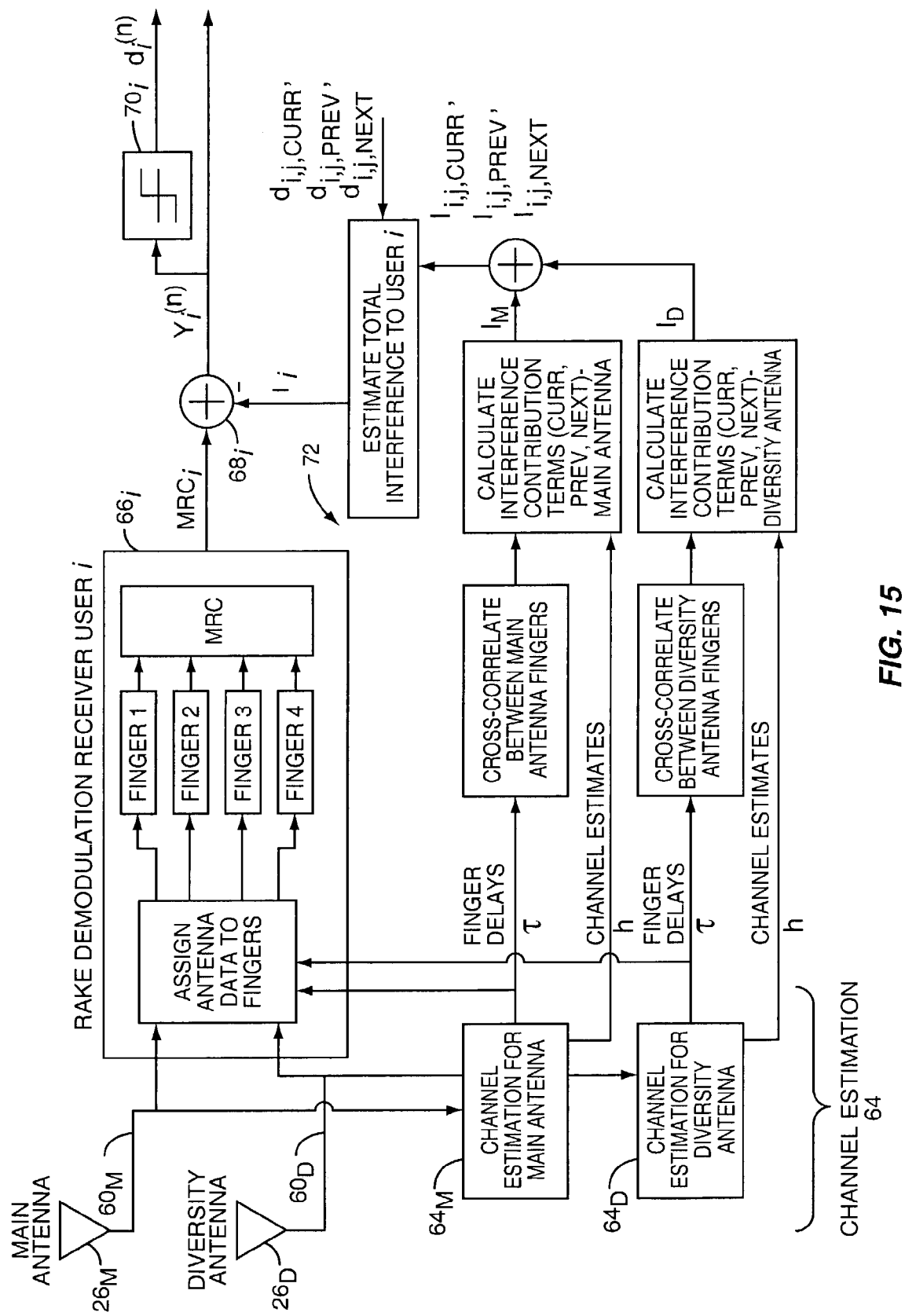

FIG. 15 is a functional block representation illustrating symbol rate parallel interference cancellation with multiple antennas according to one embodiment of the present invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
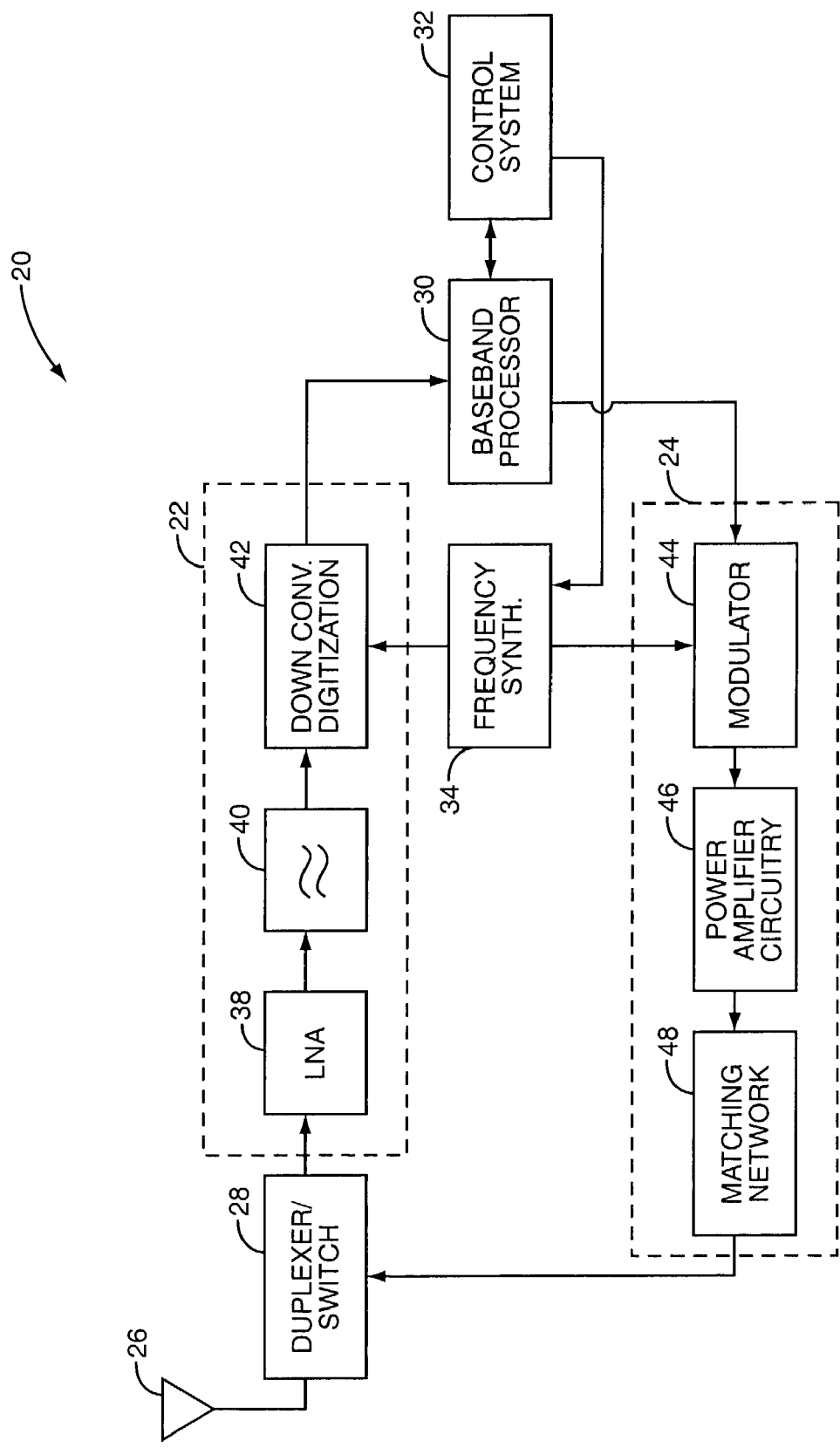
FIG. 1 is a block representation of a transceiver, such as that found in a base station, according to one embodiment of the present invention.

The present invention may be incorporated in a base station transceiver 20 as illustrated in FIG. 1 and will include a receiver front end 22, a radio frequency transmitter section 24, an antenna 26, a duplexer or switch 28, a baseband processor 30, a control system 32, and a frequency synthesizer 34. The receiver front end 22 receives information bearing radio frequency signals from one or more remote transmitters provided by mobile terminals, such as mobile telephones, wireless personal digital assistants, or like wireless communication devices. A low noise amplifier 38 amplifies the signal. A filter circuit 40 minimizes broadband interference in the received signal, while downconversion and digitization circuitry 42 downconverts the filtered, received signal to an intermediate or baseband frequency signal, which is then digitized into one or more digital streams. The receiver front end 22 typically uses one or more mixing frequencies generated by the frequency synthesizer 34.

The baseband processor 30 processes the digitized received signal to extract the information or data bits conveyed in the received signal. This processing typically comprises demodulation, decoding, error correction, and interference cancellation operations, the latter of which being the focus of the present invention. The baseband processor 30 is generally implemented in one or more digital signal processors (DSPs), application specific integrated circuits (ASICs), and field programmable gate arrays (FPGAs). Further detail regarding the operation of the baseband processor 30 and parallel interference cancellation is described in greater detail below. On the transmit side, the baseband processor 30 receives digitized data, which may represent voice, data, or control information from the control system 32, which it encodes for transmission. The encoded data is output to the transmitter 24, where it is used by a modulator 44 to modulate a carrier signal that is at a desired transmit frequency. Power amplifier circuitry 46 amplifies the modulated carrier signal to a level appropriate for transmission, and delivers the modulated carrier signal to antenna 26 through a matching network 48.

In a typical parallel interference cancellation (PIC) system, the input signal is composed of multiple user signals separated by orthogonal or substantially orthogonal (quasi-orthogonal) codes. For a specific time duration, or slot, the input signal is separated into M individual signals corresponding to each of the multiple users and demodulated to recover K symbols for each of the M individual signals. In a typical "regeneration" process, the respective K symbols for the M users are remodulated using the appropriate spreading and scrambling coding and are filtered using channel estimates to create M regenerated signals. For each user, the regenerated signals for the other M−1 users are subtracted from the original input signal to form M new individual signals. This last step is repeated for each user to create M individual signals, one for each of the M users. These new individual signals are each demodulated and reprocessed, theoretically with higher reliability than in the previous step, for as many iterations as desired. The output of the last iteration is used to form the final symbol decisions for each of the M user signals. A survey of interference cancellation techniques for code-division multiple access (CDMA) is given in S. Moshavi, "Multi-User Detection for DS-CDMA Communications," IEEE Communications Magazine, October 1996, pp. 124-136, which is incorporated herein by reference.

Figure 2A:
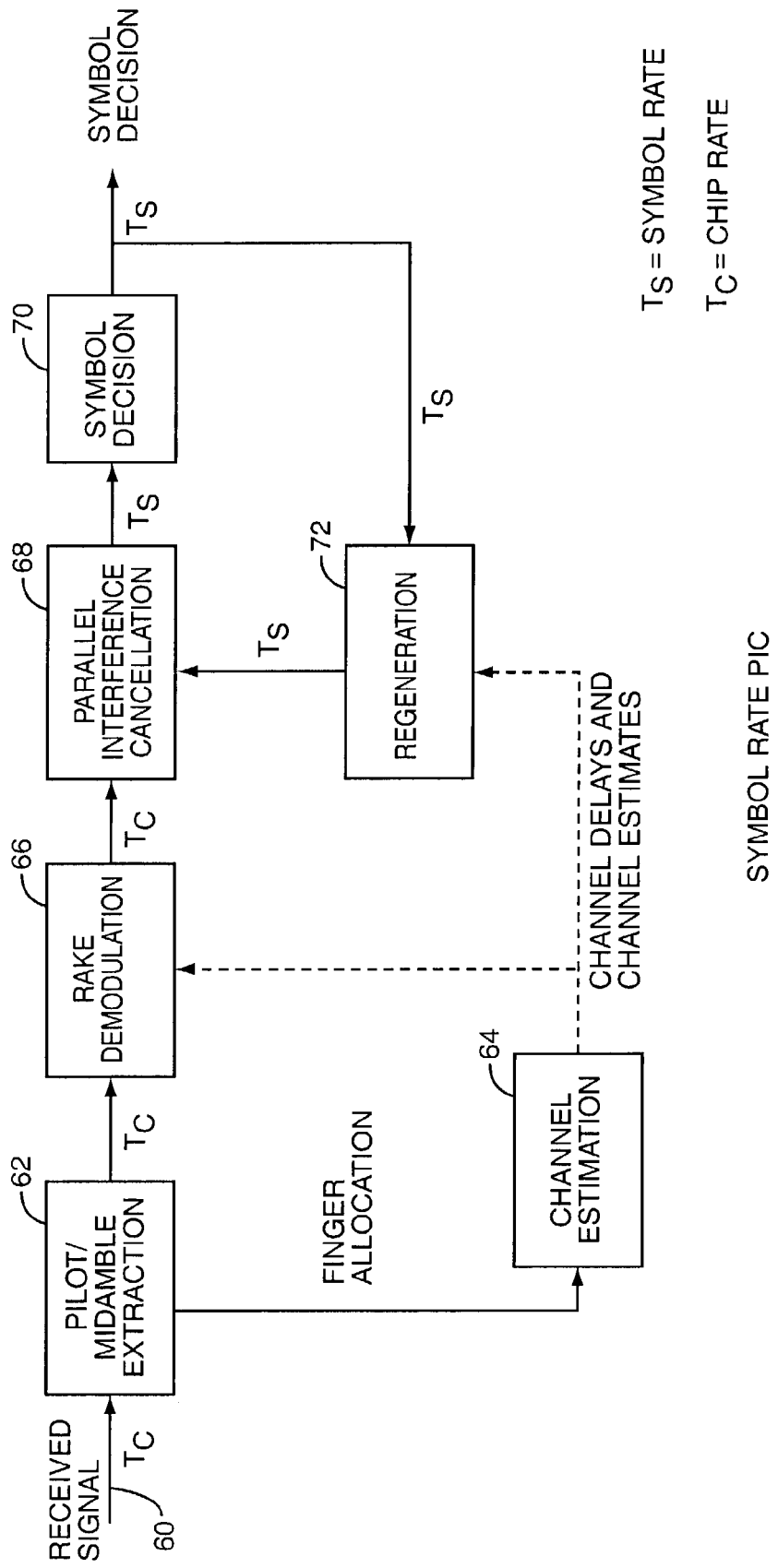
FIG. 2A is a functional block representation of a symbol rate parallel interference cancellation architecture according to one embodiment of the present invention.
Figure 2B:
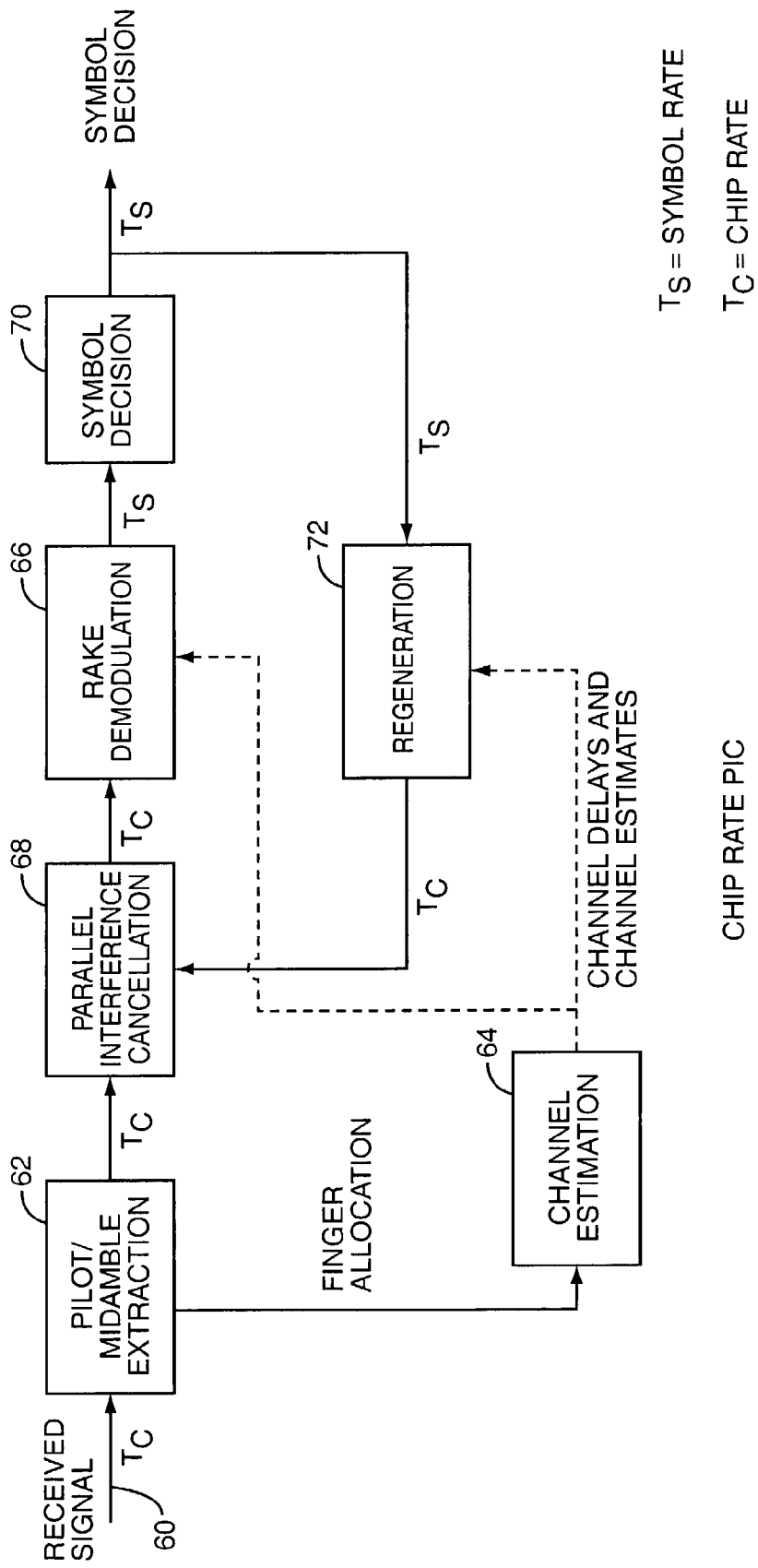
FIG. 2B is a functional block representation of a chip rate parallel interference cancellation architecture according to one embodiment of the present invention.

High-level architectures representative of PIC circuitry chip rate and symbol rate PIC embodiments for the present invention are illustrated in FIGS. 2A and 2B. The details of the present invention are provided after the overview of symbol rate and chip rate PIC architectures. The embodiment of FIG. 2A is referred to as symbol rate PIC due to the fact that interference is cancelled at the symbol rate and on a symbol-by-symbol basis. The baseband processor 30 will preferably include the circuitry and software to implement the following structure or functionality. In general, the following functions are provided in hardware, software, or a combination thereof: pilot signal or midamble extraction 62, channel estimation 64, rake demodulation 66, parallel interference cancellation 68, symbol decision 70, and signal regeneration 72.

Initially, the pilot or midamble extraction function 62 extracts training signals, such as pilot signals or midambles, from the received input signal 60 for a given slot, and channel conditions are obtained for each user from the channel estimation function 64. Since the pilot signal or midambles from the various users are known by the receiver, the channel estimation function 64 can correlate the known pilot signals or midambles with those received for each user and each multipath signal associated therewith. Accordingly, the relative timing of correlations between the received signal and the pilot signals or midambles for the various users is indicative of the relative channel delays for the multipath signals for each user. Further, the relative magnitude and phase of the correlation corresponds to the attenuation of the signal caused by the channel. For simplicity, the relative delays are referred to as channel delays, and the attenuations caused by the channel or the channel response are referred to as channel estimates. The channel delays and estimates may change at different rates and may be provided by the same or different entities depending on the desired design. The channel delays and estimates are used for the constituent rake demodulation 66, and are used directly or indirectly by the regeneration function 72 to regenerate signals to calculate interference Upon reception, rake demodulation 66 separates the composite input signal 60 into individual signals corresponding to the respective signals for each user in light of the channel delays provided by the channel estimation 64. To determine the individual signals for each user during subsequent iterations, the PIC function 68 subtracts the regenerated interference signals corresponding to all other individual signals from the composite input signal 60 for the given time slot. The regenerated signals for each user are provided by the regeneration function 72.

As noted, rake demodulation 66 is used to demodulate each individual user's signal from the composite input signal 60. Although not required, rake demodulation on the preferred embodiment incorporates maximum ratio combining (MRC). As such, the incoming received signal 60 is a baseband signal, which is first passed through a root-raised-cosine (RRC) filter (not shown). The RRC filter is matched to the RRC filter of the transmitter, which transmitted the signal being received. The RRC filter is specified by the communication standard and is the one used in existing CDMA architectures. The composite input signal 60 after being filtered is usually a four or eight-times oversampled signal. The oversampled signal is then passed through each of the fingers of the rake receiver. Each finger delays the resulting signal by the appropriate delay and decimates the signal to the chip rate. This chip rate signal is then despread by being multiplied by the conjugate of the signature sequence, or code, of the given user. The term signature sequence is meant to be a general term for the spreading and/or scrambling code for that particular user. In some CDMA systems, the spreading/scrambling and despreading/descrambling may be done in two steps where first the signal is spread and then it is scrambled, and vice versa in the receiver. These steps may be performed in a single step, if the code is the combined spreading and scrambling code. So, for instance in a UMTS FDD uplink, the signature sequence is the combination of the scrambling code of a given user and the orthogonal varying spreading function (OVSF) code of the data channel for the user.

After the multiplication by the conjugate of the code, despreading is completed by summing over the spreading factor for that user. The resulting output is at the symbol rate. The outputs of the individual fingers are then combined together. In maximum ratio combining, the weight factors for the combining step are the conjugates of the channel estimates for the respective paths. Other combining weights may be used as will be recognized by those skilled in the art. Symbol estimates for each user are determined by applying the symbol decision function 70 to the outputs of the rake demodulator 66 in traditional fashion. The symbol decision function 70 may be implemented in software or hardware using symbol detection circuitry. The regeneration function 72 essentially recreates estimates of each of the various user's signals from the symbol estimates based on the corresponding channel delays and estimates.

Thus, the output of the regeneration function 72 provides estimates for each of the individual signals received for each user corresponding to the output of the rake demodulation function 66. The individual signals from other users are considered as interference to any given user. For each user, the PIC function 68 will iteratively subtract out the regenerated estimates of the interfering signals from all other users in an effort to recover the transmitted signal for a given user on a symbol-by-symbol basis after rake demodulation.

As illustrated in FIG. 2B, a chip rate PIC attempts to cancel interference from other users prior to rake demodulation at the chip rate, or at an oversampled rate, instead of after demodulation at the symbol rate. While chip rate cancellation is more computationally intensive, it leads to a simple data path-oriented structure and has a complexity that is linear to the number of users. Similar to the above-described symbol rate PIC architecture, the following functions are provided in hardware, software, or a combination thereof: pilot signal or midamble extraction 62, channel estimation 64, parallel interference cancellation 68, rake demodulation 66, symbol decision 70, and signal regeneration 72.

As above, the pilot or midamble extraction function 62 extracts the pilot signal or midamble from the received input signal 60 for a given slot, and channel delays and estimates are obtained for each user from the channel estimation function 64 in traditional fashion. The channel delays are used for chip rate finger allocation in the constituent rake demodulation 66.

Upon reception, the PIC function 68 is bypassed and rake demodulation 66 separates the composite input signal 60 into M individual signals corresponding to the respective signals for each user. To determine the individual signals for each user during subsequent iterations, the PIC function 68 subtracts the regenerated chip rate signals corresponding to all other individual signals from the composite input signal 60 for the given time slot.

Again, rake demodulation 66 is used to demodulate each individual user's signal from the composite input signal 60. Demodulation may include despreading each individual signal with a unique channelization code and descrambling all individual signals using the base station's descrambling code. This operation is performed at the chip rate, producing a complex, symbol rate output. Symbol estimates for each user are determined by applying the symbol decision function 70 to the rake demodulation outputs in traditional fashion. The regeneration function 72 recreates estimates of the individual chip rate signals from the symbol decisions for each of the estimated users, and individually processes the modulated symbols based on the corresponding channel estimates. Accordingly, the regeneration function 72 will typically involve the following steps for each user:

receiving symbols for each user at a symbol rate, spreading the symbols with each user's specific channelization code, scrambling the spread signals with the base station's scrambling code, and filtering the spread and scrambled signals with the user's channel estimates.

The output of the regeneration function 72 provides chip rate, or oversampled, estimates for each of the spread individual signals received for each user. For each individual user, the regenerated signals for all of the other users are essentially subtracted from the received signal 60 by the PIC function 68 prior to rake demodulation 66 at the chip rate.

Figure 3:
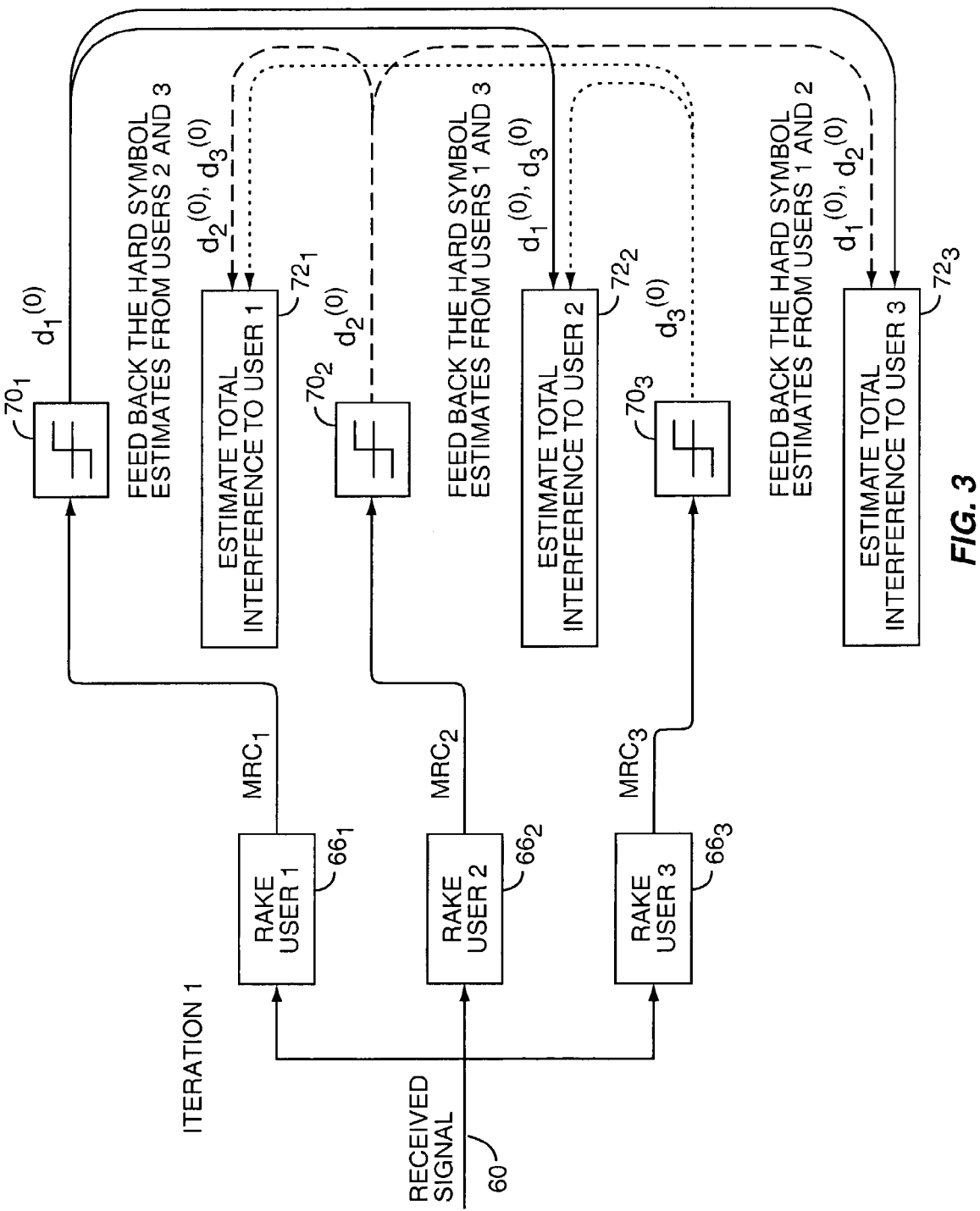
FIGS. 3-8 illustrate the functionality of symbol rate parallel interference cancellation according to one embodiment of the present invention.

With reference to FIGS. 3-8, an exemplary symbol rate parallel interference cancellation process is described with three users. The received signal 60 will include multipath signals from Users 1-3, and is provided to a rake demodulation function 66, which provides individual rake demodulation $66_1$-$66_3$ for each of the users. For each user, the rake demodulation $66_{1-3}$ will effectively combine the multipath signals for each given user by summing the outputs of each finger in the rake demodulation function 66 using maximum ratio combining (MRC). Thus, as illustrated in FIG. 3, rake demodulation $66_1$ for User 1 provides a symbol rate output corresponding to the MRC of each of the multipath signals for User 1. For reference, the MRC output for each User i is designated $MRC_i$, where i can be 1-3 in this three-user scenario. Thus, $MRC_1$ is a signal consisting of a number of symbols for User 1.

The $MRC_i$ output is sent to a corresponding symbol decision function $70_1$, which generates a hard symbol decision $d_i^{(n)}$ based on the $MRC_i$ output, where n is the PIC iteration and i is the user. The hard symbols $d_i^{(n)}$ are fed to regeneration function $72_i$ for the other users. For example, the hard symbol $d_1^{(0)}$ for User 1 is sent to the regeneration functions $72_2$ and $72_3$ for User 2 and User 3, respectively. The hard symbol decision for User 2, $d_2^{(0)}$, is sent to regeneration functions $72_1$ and $72_3$ for User 1 and User 3, while the hard symbol decision, $d_3^{(0)}$, for User 3 is sent to regeneration functions $72_1$ and $72_2$ for User 1 and User 2.

Thus, the regeneration functions $72_1$-$72_3$ receive the hard symbol decisions $d_i^{(0)}$ for each of the other two interfering users. As will be discussed in further detail below, regeneration functions $72_1$-$72_3$ will effectively generate estimates of the total interference to a given user based directly or indirectly on the symbol decisions from the other users and the respective channel conditions for those users.

Figure 4:
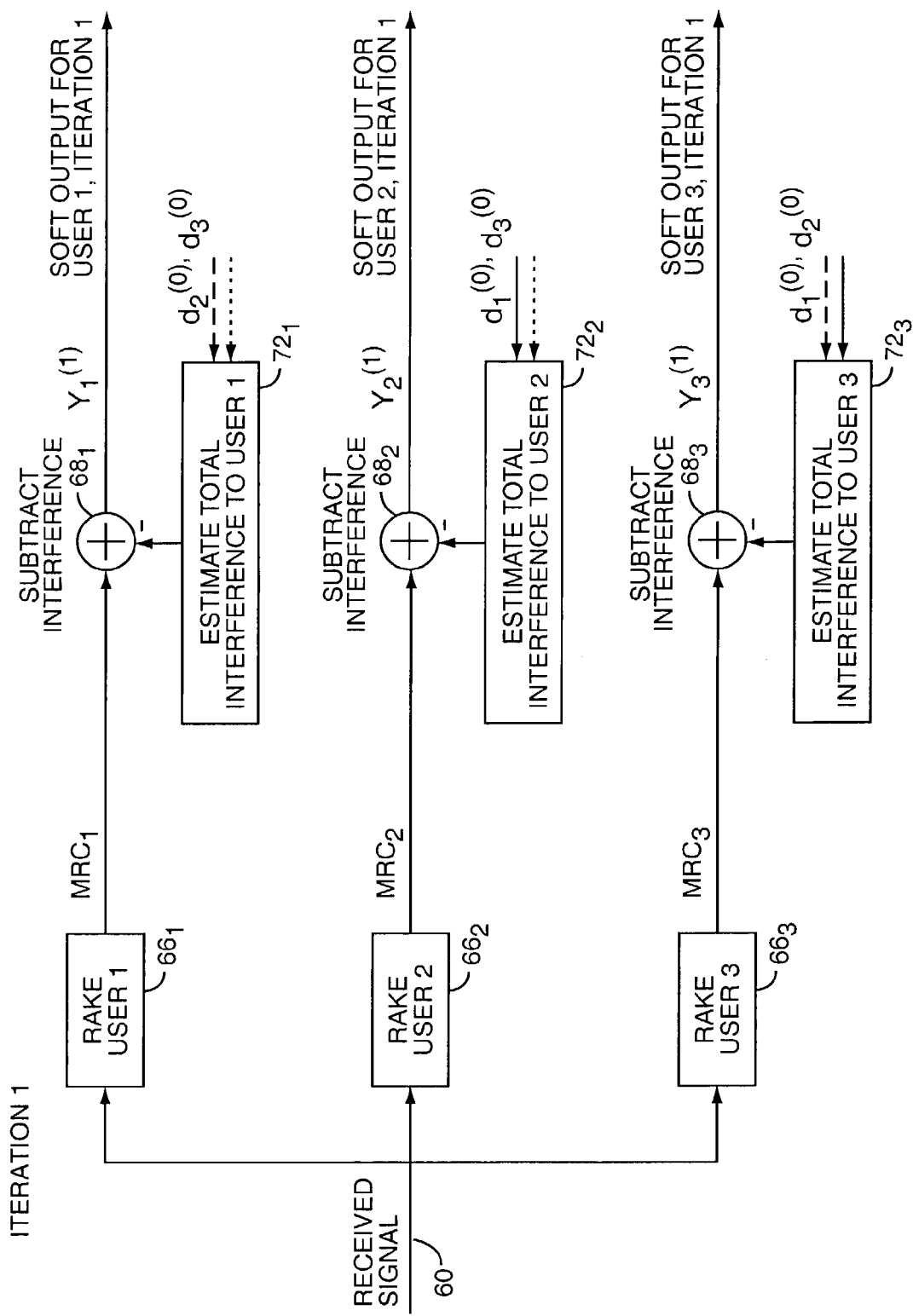
Figure 5:
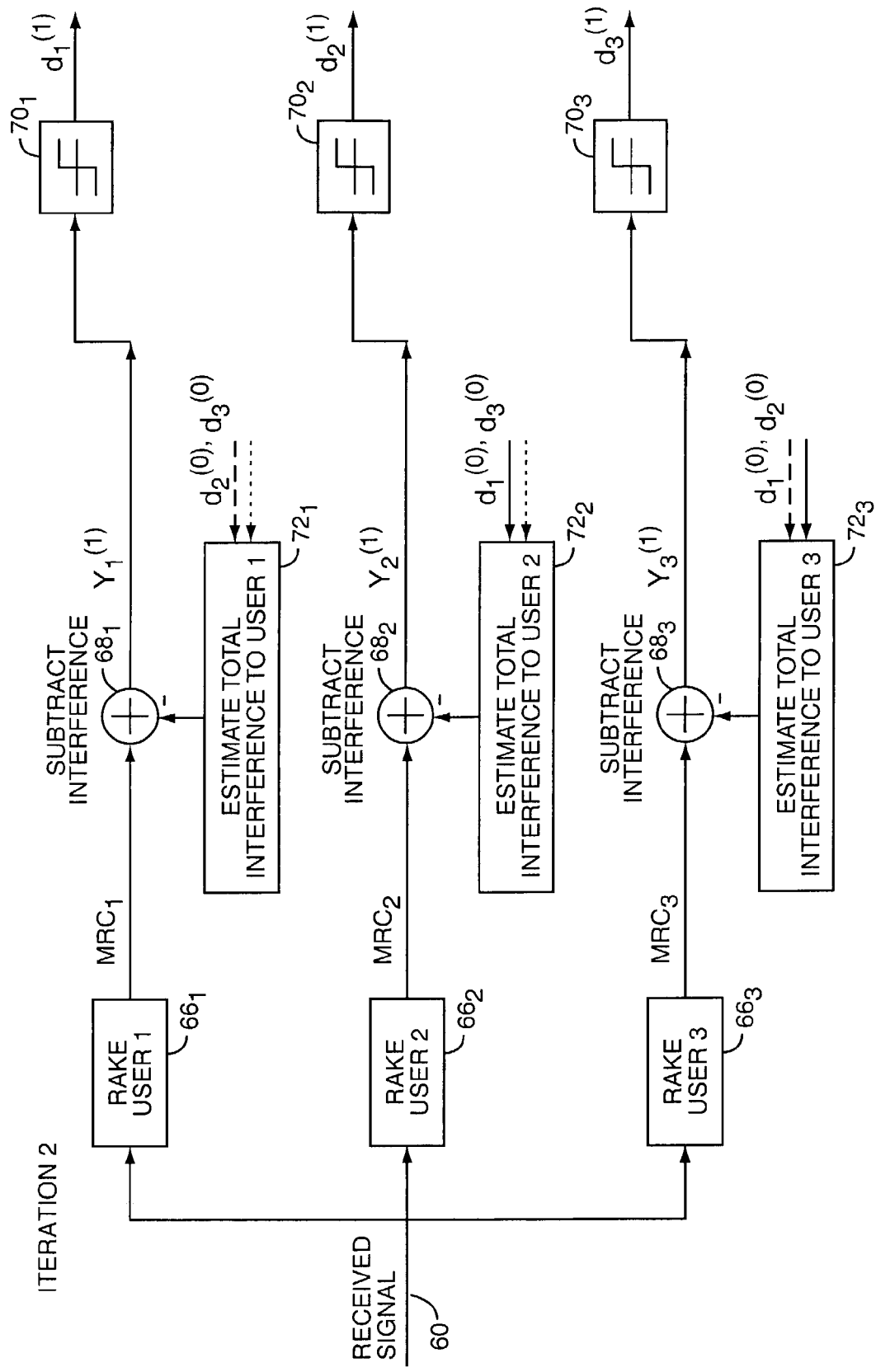
Figure 6:
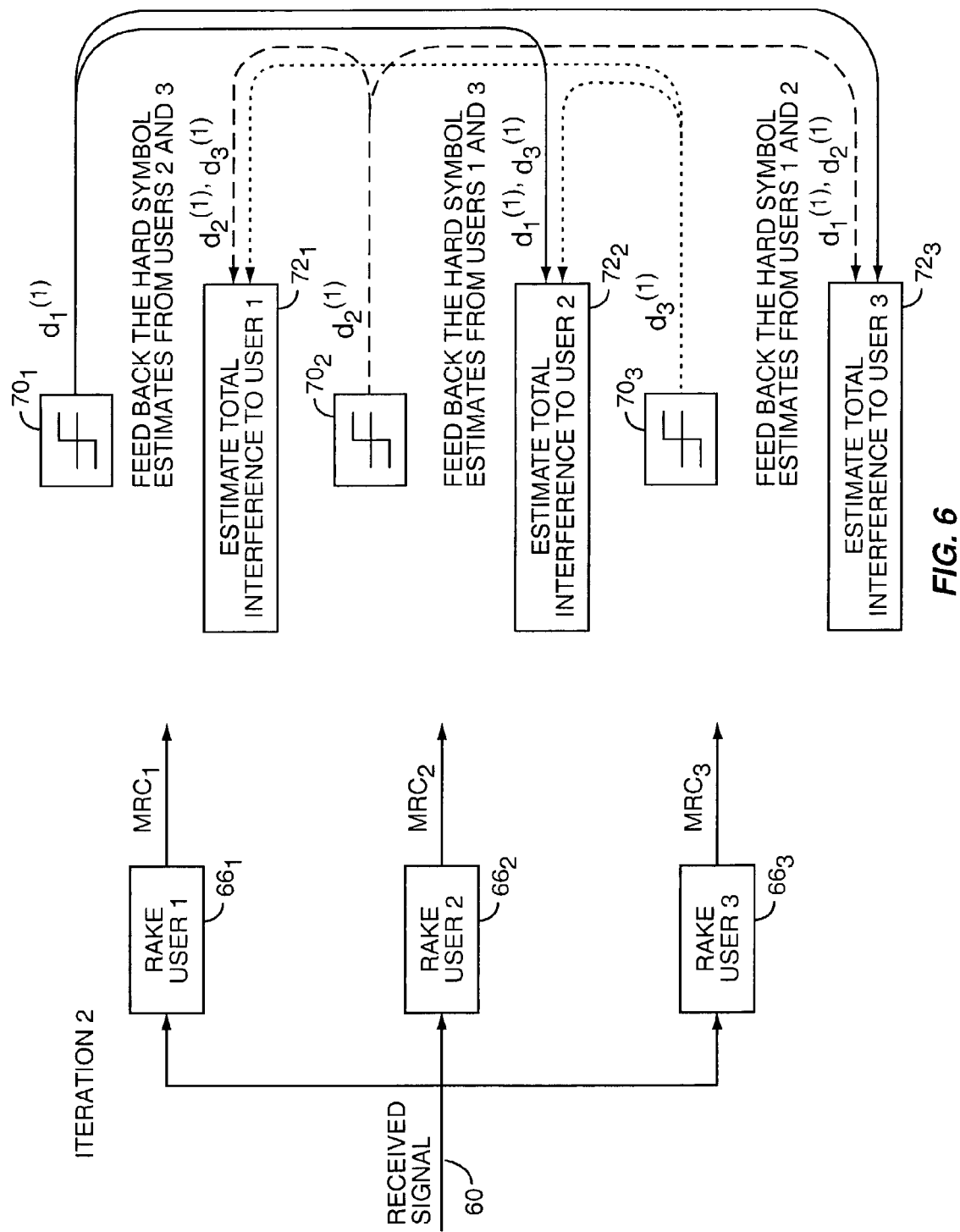
Figure 7:
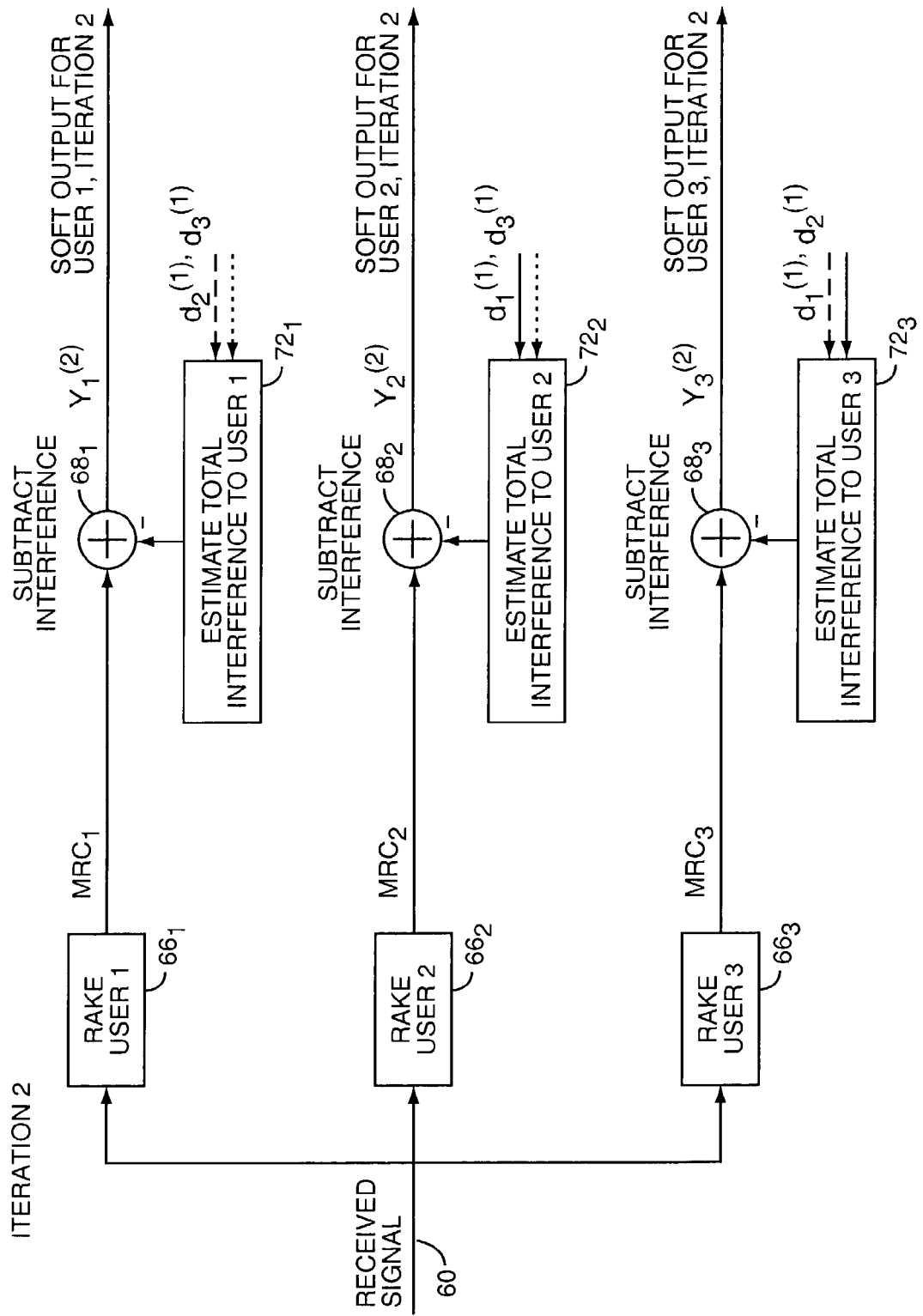
Figure 8:
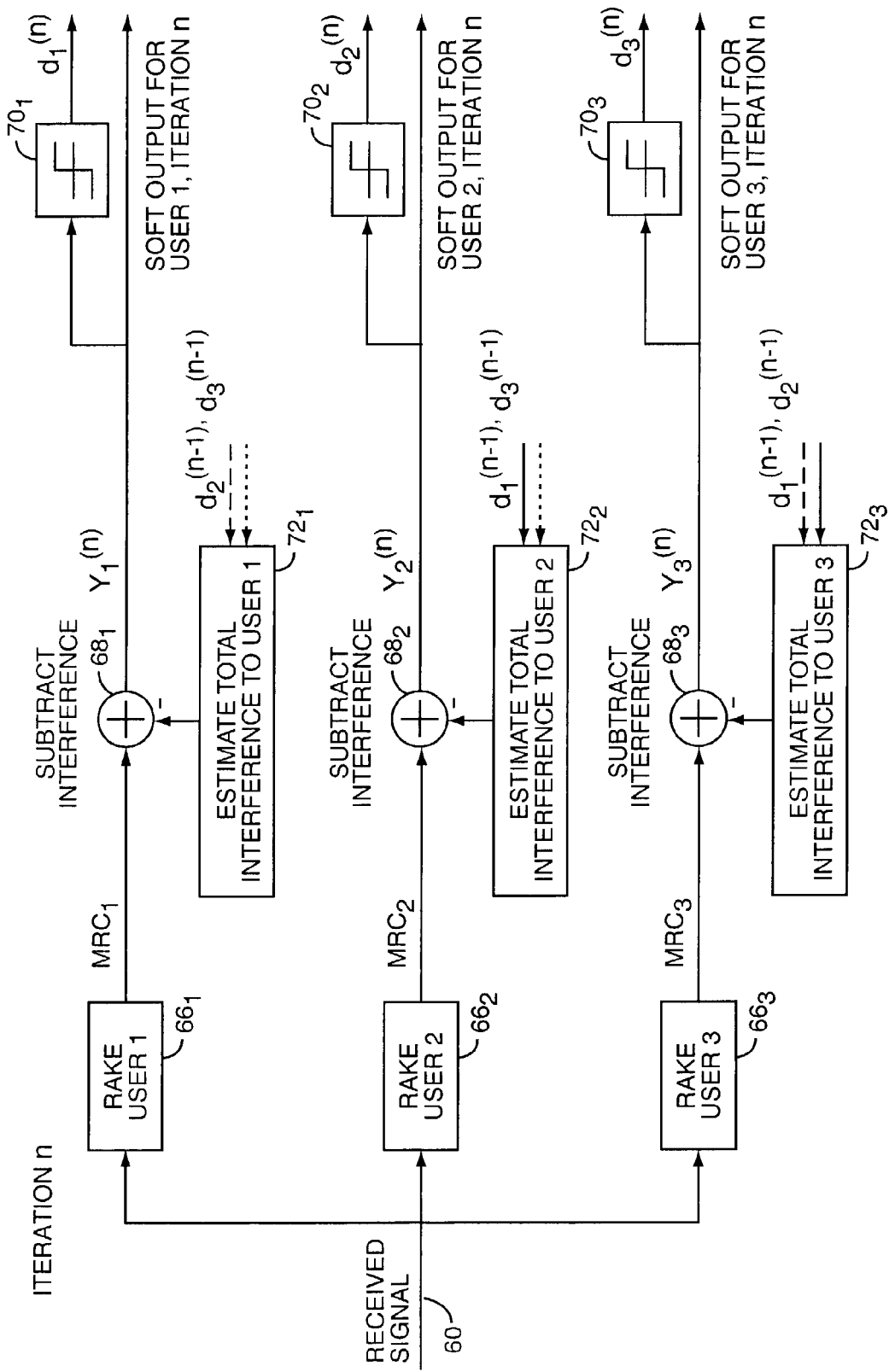

As shown in FIG. 4, the estimated total interference to each user is summed together and then subtracted from the original $MRC_i$ outputs using PIC function $68_i$, to provide soft outputs $Y_i^{(n)}$. Next, and as seen in FIG. 5, the soft outputs $Y_i^{(n)}$ for each user are sent to the corresponding symbol decision functions $70_i$, which generate hard symbol decisions output from the first iteration $d_i^{(1)}$ for Users 1-3. The hard symbol decisions $d_i^{(1)}$ for the interfering users are fed back to a given user's regeneration function $72_i$. As shown in FIG. 6, the hard symbol decisions $d_2^{(1)}$ and $d_3^{(1)}$ for Users 2 and 3 are fed back to the regeneration function $72_1$ for User 1, the hard symbol decisions $d_1^{(1)}$ and $d_3^{(1)}$ for Users 1 and 3 are fed back to the regeneration function $72_2$ for User 2, and the hard symbol decisions $d_1^{(1)}$ and $d_2^{(1)}$ for Users 1 and 2 are fed back to regeneration function $72_3$ for User 3. As shown in FIG. 7, the regeneration function $72_i$ will estimate the total interference to User i and the PIC function $68_i$ will subtract the estimated total interference to User i from the MRC output, and generate a soft output $Y_i^{(2)}$ for the second iteration. The process will continue as desired, or until successive soft outputs $Y_i^{(n)}$ remain relatively consistent or a set number of iterations have occurred, as illustrated in FIG. 8. Notably, the MRC output is stored and operated on for each iteration, wherein from one iteration to the next the estimated total interference to User i becomes more and more accurate, and thus subtracting it from the original MRC symbol will ultimately result in an accurate soft output $Y_i^{(n)}$, which will produce an accurate final symbol decision.

Figure 9:
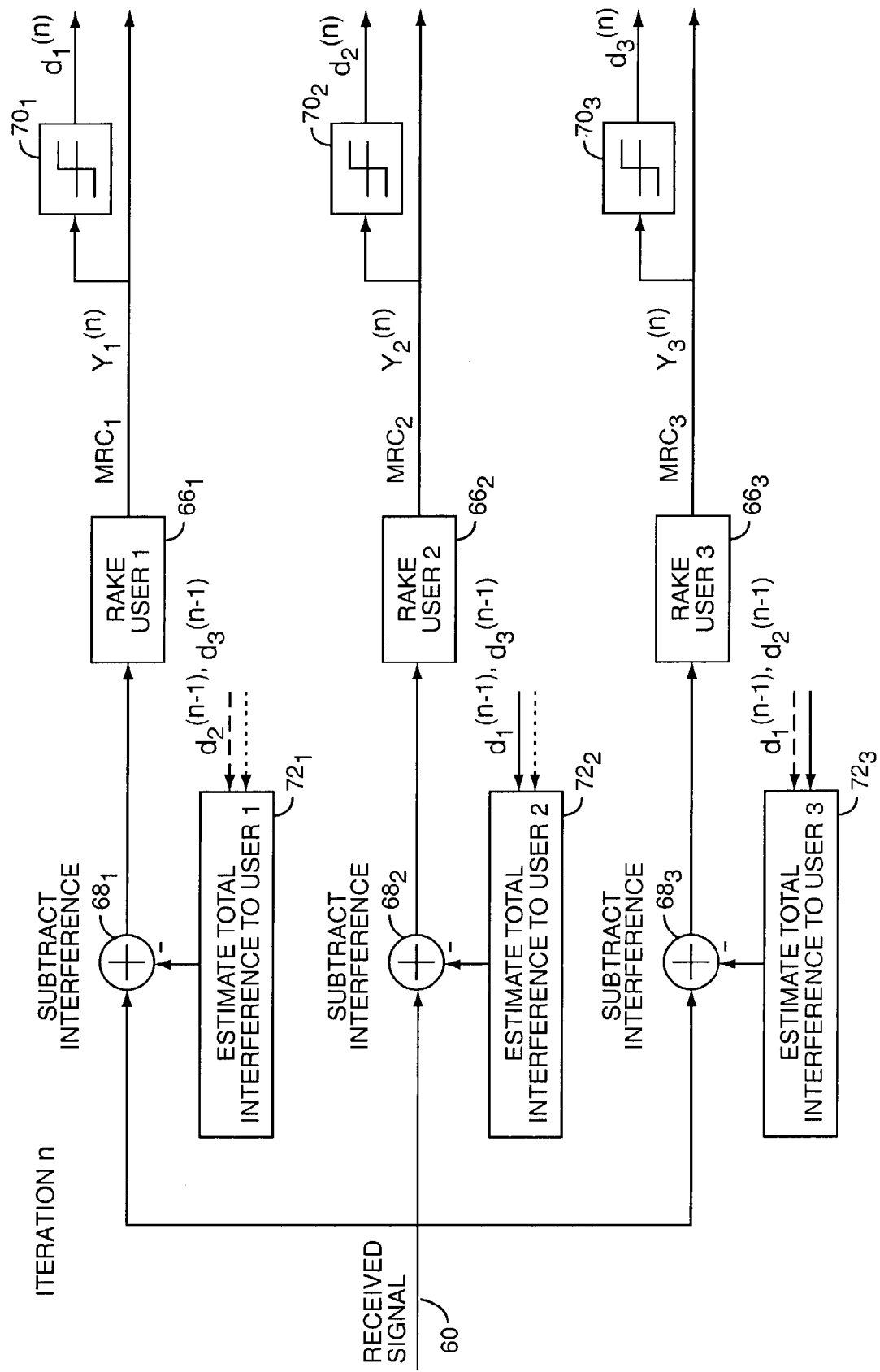
FIG. 9 illustrates the functionality of chip rate parallel interference cancellation according to one embodiment of the present invention.

FIG. 9 illustrates parallel interference cancellation in a chip rate architecture, wherein the estimated total interference to a given user is subtracted from a segment of the received signal 60 prior to rake demodulation. In such an embodiment, the regeneration function $72_i$ must modulate the hard symbol decisions $d_i^{(n)}$ with the appropriate signature sequences, such as scrambling and spreading codes, prior to the hard symbol decisions being subtracted from the received symbol at the chip rate on a chip-by-chip basis.

Since signals from different users typically have different channel delays caused from being at different distances from the receiver, interference to a given user's current symbol may come from the interfering users' current, previous, or next symbols. As such, the interference contribution from the current, previous, and next symbols of the other users is taken into consideration when determining the total interference from all the users to the given user in the present invention. FIG. 10 illustrates the regeneration of interference to a given user from all other users according to one embodiment of the present invention. In particular, FIG. 10 only illustrates parallel interference cancellation for a given user (User 1) based on hard symbol decisions fed back in an iterative process for the other interfering users (Users 2 and 3). As such, the rake demodulation function $66_1$ provides an $MRC_1$ output from the received signal 60 corresponding to a received symbol. The $MRC_1$ output is stored and used for parallel interference cancellation at the symbol rate. The $MRC_1$ output is provided to the PIC function $68_1$, which subtracts the total interference to User 1, $I_1$ from the $MRC_1$ output to provide the soft output $Y_1^{(n)}$.

To generate the total interference to User 1 ($I_1$), hard symbol decisions of a previous iteration from the interfering users are each processed based on interference contribution terms for the previous, current, and next interfering symbols. Thus, hard symbol decisions for the previous, current, and next symbols for each interfering user, $d_{i,prev}^{n-1}$, $d_{i,curr}^{n-1}$, and $d_{i,next}^{n-1}$, are each respectively processed in light of a corresponding interference contribution term $I_{i,2,prev}$, $I_{i,2,curr}$, and $I_{i,2,next}$, respectively. The interference contribution term $I_{i,j,z}$ represents the interference contribution of a symbol for interfering User j on a symbol for select User i, wherein the symbol for User j may be the previous, current, or next (z) symbol in relation to the current symbol being received by User i. Thus, the interference contribution terms for the previous, current, and next symbols of interfering users are respectively used to modify the hard symbol decisions for the previous, current, and next symbols of the interfering users. The modification is illustrated by multiplication functions $74_2$ and $74_3$ for Users 2 and 3. The modified hard symbol decisions for the previous, current, and next symbols for Users 2 and 3 are summed through summing functions $76_2$ and $76_3$, respectively, wherein the summed outputs are further summed by summing function 78 to generate the total interference to User 1, $I_1$.

As will be described below, the interference contribution terms $I_{i,j,z}$ are fixed from symbol to symbol, and once calculated, may remain constant over numerous symbols, which greatly reduces computational complexity. The interference contribution terms are fixed over a time period for which the channel estimates and channel delay are deemed to be constant. Although the interference contribution terms $I_{i,j,z}$ are relatively fixed for a given sequence of symbols, the hard symbol decisions $d_i^{(n)}$ will change from one symbol to the next, as will the total interference to User 1, $I_1$, which is a function of the hard symbol decisions $d_i^{(n)}$. By generating the interference contribution terms only when the channel or delay estimates change, these values are then stored and are simply loaded from memory as the PIC is performed iteration to iteration. Prior art PIC techniques require much of the computationally intensive regeneration steps to be performed each and every iteration. The pre-computing of the interference contribution terms means that the computational complexity per iteration is very low, and thus, there is little additional cost to running additional iterations.

FIG. 11 illustrates how the interference contribution terms for the current, previous, and next symbols of each interfering user are derived. The interference contribution terms $I_{i,j,curr}$, $I_{i,j,prev}$, and $I_{i,j,next}$ are derived from analyzing the correlation of the signature sequences in light of the channel delays τ and channel estimates h for each user and for each multipath signal thereof. In the preferred embodiment, these interference contribution terms are essentially derived in three steps. Notably, the signature sequences, such as the individual users' channelization codes and scrambling codes, are known by the regeneration function 72. The regeneration function 72 receives the relative channel delays τ corresponding to the various multipath delays for each of the users. Each channel delay τ corresponds to a finger in rake demodulation for each of the users. Accordingly, each user is associated with one or more multipath delays, which correspond to fingers for corresponding rake demodulation.

For each user, a cross-correlation value is determined for each delay with respect to all of the other interfering users' delays. Signature sequences used by the different users are typically orthogonal or at least substantially orthogonal to each other, and as such, will not interfere with one another as long as the signature sequences are aligned. Unfortunately, signals from different users are typically received with varying delays due to channel delays and transmission distances. As such, the encoded symbols are not aligned and will interfere with one another. The amount of interference one signal will have on another is a function of the cross-correlation of the signature sequences at the relative offsets defined by the channel delays. For the present invention, the cross-correlation values for each multipath signal of User i are determined with respect to all multipath signals of each User j for the current, previous, and next symbols. The cross-correlation values are based on the relative time delays of the current, previous, and next symbols of each User j with respect to the current symbol of User i. Thus, for each delay associated with User i, a cross-correlation value is determined with each delay associated with each User j (all interfering users). Each cross-correlation value corresponds to a pair of rake fingers, wherein one rake finger of the pair is associated with User i and the other is associated with User j.

Individual cross-correlations are calculated by:

$$R_{i,j,prev}^{p,q} = \frac{1}{SF}\sum_{k=1}^{SF} v_j(kT_c + T_S + \tau_{p,q})s_i^*(kT_c)$$

with $R_{i,j,next}^{p,q}=0$ when finger q precedes finger p, or $$R_{i,j,next}^{p,q} = \frac{1}{SF}\sum_{k=1}^{SF} v_j(kT_c - T_S + \tau_{p,q})s_i^*(kT_c)$$

with $R_{i,j,prev}^{p,q}=0$ when finger p precedes finger q.

For interference to User i from User j's previous, current, and next data symbols relative to User i's current symbol, P refers to User i's $p^{th}$ finger, and $q$ refers to the $q^{th}$ finger of User j. $\tau_{p,q}$ is the relative delay between the $p^{th}$ finger and the $q^{th}$ finger ($\tau_p-\tau_q$). $s_i$ is one symbol's worth of the desired user's signature sequence, while $v_j$ is one symbol's worth of the interferer's filtered signature sequence. Note that this filtering of the interferer's signature sequence is by the concatenated transmit and receive pulse-shaping filters. The chip period is $T_c$, and the symbol period is $T_s$, which equals the spreading factor (SF) multiplied by the chip period $T_c$.

These cross-correlations essentially define interference based on coding delays, without the impact of channel attenuation, on each multipath signal from the multipath signals from interfering users. Notably, these cross-correlation values are not a function of the actual data symbols being transmitted, but only the cross-correlations of the various signature sequences in light of the relative channel delays $\tau_{p,q}$. To determine the actual interference contributions on a given user's signal based on the interfering users' signals, the impact of the channel attenuations must be taken into consideration. As such, step two essentially combines the multipath signals for each individual interfering User j in light of the channel estimates $h_j$ for each User j. In step three, the interfering contributions for each multipath signal of User i can be combined using maximum ratio combining in a fashion similar to that provided in the rake demodulation function 66 to effectively combine the individual interference contributions from other users. Again, these latter two steps are provided for the current symbol being processed for User i in light of the current, previous, and next symbols of each of the interfering Users j.

The interference contributions from the previous, current, and next symbols of interfering User j onto the current symbol of the desired User i can be represented as follows:

$$I_{i,j,curr}=h_i R_{i,j,curr}^{p,q} h_j$$

$$I_{i,j,curr} = h_i R_{i,j,curr}^{p,q} h_j$$
$$= [h_{i,1}^* \ h_{i,2}^* \ \cdots \ h_{i,L}^*] \begin{bmatrix} R_{i,j,curr}^{1,1} & R_{i,j,curr}^{1,2} & \cdots & R_{i,j,curr}^{1,L} \\ R_{i,j,curr}^{2,1} & R_{i,j,curr}^{2,2} & \cdots & R_{i,j,curr}^{2,L} \\ \vdots & \vdots & \ddots & \vdots \\ R_{i,j,curr}^{L,1} & R_{i,j,curr}^{L,2} & \cdots & R_{i,j,curr}^{L,L} \end{bmatrix} \begin{bmatrix} h_{j,1} \\ h_{j,2} \\ \vdots \\ h_{j,L} \end{bmatrix}$$

$$I_{i,j,prev}=h_i R_{i,j,prev}^{p,q} h_j$$

$$I_{i,j,next}=h_i R_{i,j,next}^{p,q} h_j,$$

where $h_i$ is the channel matrix for User i's multipath signals and $h_j$ is the channel matrix for the interfering User j's channel matrix. Accordingly, the interference contributions for the previous, current, and next symbols of User j onto the current symbol of User i can be expressed as a function of the cross-correlations between pairs of fingers of the interfering and desired users in light of the channel conditions for each user.

The cross-correlations for each of the interfering fingers are combined to effectively recreate the superposition of the characteristics of the transmission paths. This combination can be accomplished by the following:

$$R_{i,j,curr}^P = R_{i,j,curr} h_j$$

$$R_{i,j,curr}^P = \begin{bmatrix} R_{i,j,curr}^{1,1} & R_{i,j,curr}^{1,2} & \cdots & R_{i,j,curr}^{1,L} \\ R_{i,j,curr}^{2,1} & R_{i,j,curr}^{2,2} & \cdots & R_{i,j,curr}^{2,L} \\ \vdots & \vdots & \ddots & \vdots \\ R_{i,j,curr}^{L,1} & R_{i,j,curr}^{L,2} & \cdots & R_{i,j,curr}^{L,L} \end{bmatrix} \begin{bmatrix} h_{j,1} \\ h_{j,2} \\ \vdots \\ h_{j,L} \end{bmatrix}$$

$$R_{i,j,prev}^P = R_{i,j,prev} h_j$$

$$R_{i,j,next}^P = R_{i,j,next} h_j$$

The interference contributions for the previous, current, and next symbols of User j onto the current symbol of User i is calculated by:

$$I_{i,j,curr}=h_i R_{i,j,curr}^P$$

$$I_{i,j,curr} = h_i R_{i,j,curr}^P$$

-continued $$= \begin{bmatrix} h_{i,1}^* & h_{i,2}^* & \cdots & h_{i,L}^* \end{bmatrix} \begin{bmatrix} R_{i,j,curr}^1 \\ R_{i,j,curr}^2 \\ \vdots \\ R_{i,j,curr}^{L_D} \end{bmatrix}$$

$$I_{i,j,prev} = h_i R_{i,j,prev} P$$

$$I_{i,j,next} = h_i R_{i,j,next} P$$

The effect of this last operation emulates the maximum ratio combining over the desired user's fingers in the rake demodulation function 66. Thus, the result is a set of complex numbers that represents interference contributions from the previous, current, and next symbols of User j for the current symbol of User i. Importantly, these interference contributions are not based on, nor are they a function of, symbols fed back during the PIC process, and thus, may be applied to numerous consecutive symbols without requiring recalculation. Since the interference contribution terms are a function of the channel delays and channel estimates, they only need to be recalculated when either or both of the channel delays or channel estimates change. Typically, channel delays and channel responses change slowly and at different rates, relative to the rate at which symbols are processed.

With reference back to FIG. 10, the interference contributions $I_{1,2,next}$, $I_{1,2,current}$, and $I_{1,2,previous}$ are applied to the hard symbol decisions fed back from a previous PIC iteration. Throughout the PIC process for a given symbol, and typically across numerous consecutive symbols given the multiplication of the interference contribution terms and the hard symbol decisions d, the total interference to User i, $I_1$, may change with each iteration in a given PIC process and from symbol to symbol as the hard symbol decisions d from the various users j change.

Although the interference contributions are effectively multiplied by the hard symbol estimates d, the multiplication can be implemented using simple addition of rectangular coordinates instead of the more complex multiplication calculations. This greatly reduces the computational complexity, since the interference contribution terms and symbols, in general, are complex numbers. The output of the symbol decision function 70 is generally a complex number corresponding to a quadrature-based constellation point, such as that found in QPSK where the constellation points are (1, −1, j, and −j). As such, multiplication of the complex interference contribution terms is simply an accumulation and possible swapping of the real and imaginary parts of the interference contribution terms.

One subtle point with respect to the invention is the rate of update associated with respect to the three steps used to compute the interference contribution terms. The rates of update are a function of the rate at which each of the channel delays and channel estimates are updated. There are many ways in which channel delay and channel estimation can be performed. Such estimation depends to a great extent on what the particular communication standard offers to support these functions. UMTS FDD and 1xRTT offer a pilot signal, which is code multiplexed with the data and transmitted at the same time as the data but it has a different signature sequence. UMTS TDD, on the other hand, has a training sequence inserted into the transmitted signal. Specifically, it has a midamble—a known sequence of symbols inserted into the middle of every slot. During the midamble, no data is transmitted, only the known sequence.

Both the pilot sequence and the midamble (training sequences) enable channel delay and channel estimation with relatively simple methods. The key point is that the delay and channel estimation are distinct and occur at different rates. This is shown in a UMTS FDD type example in FIG. 11A. The channel delays of a multipath channel change at a very slow rate. An update to the channel delays is only required for a time period on the order of four frames, which is 60 slots, or 40 ms, wherein each frame has 15 slots. This corresponds to an update rate of 25 updates per second for channel delays. The complex channel gain on each of the paths, however, changes at a much quicker rate. The rate of update of the channel estimates is on the order of one update per slot, or 1500 updates per second. Over this slot duration, the assumption is that the channel estimates are constant. One slot corresponds to 2560 chips, or 40 symbols for a voice user with a spreading factor of 64. So the assumption is that these 40 symbols are affected by a constant complex channel gain.

In the computation of the interference contribution terms, step one is the correlation of one symbol's worth of code of the desired user with a raised-cosine (RC) filtered version of one symbol's worth of code of the interferer. This correlation depends on two things: (1) the codes of the two users, and (2) the relative delay between the fingers of the desired and interfering user. When short codes are in use, the codes of the two users repeats, and so the correlation terms remain valid as long as the relative finger delays of the users remain the same. Information about the short codes is provided below in further detail. Notably, the correlation terms need to be updated whenever the finger delays of either user change. From the above example, this occurs 25 times a second, or once every 40 ms.

Steps two and three in computing the interference contribution terms incorporate the effect of the channel gains of each of the interfering and desired user, respectively, wherein the channel estimates reflect the channel gains for each channel. As such, steps two and three need to be performed whenever the channel estimates change. By the above example, this is once a slot, or 1500 times a second, which is much more frequent than for step one. The resulting interference contribution terms are valid until the next update, which occurs in the next slot.

Another factor in the frequency at which interference contribution terms are updated is the type of signature code used—a short code or a long code. The 1xRTT standard only has long codes, while the UMTS TDD standard only has short codes, and UMTS FDD has both long and short code options. A short code is a signature code (i.e. the combination of the scrambling and spreading code) that is periodic, and as such, repeats itself. Most long codes actually repeat themselves, but their period is very long. In UMTS TDD and FDD systems, the signature code consists of the sequential application of an OVSF code, which is used for spreading, and a scrambling code, which is used for scrambling.

Both spreading and scrambling codes have to be short codes in order for the resulting signature code to be a short code. OVSF codes (and Walsh codes for 1xRTT systems) are by their definition short codes. The scrambling codes (or PN codes as they are referred to in 1xRTT systems) can be short or long codes, depending on their definition. In UMTS TDD, the scrambling codes are short codes of 16 chips in length. In UMTS FDD, there are two scrambling codes defined. There is a long scrambling code that repeats after a very long period and a short scrambling code that repeats every 256 chips. There is no short code in 1xRTT systems.

Figure 11B:
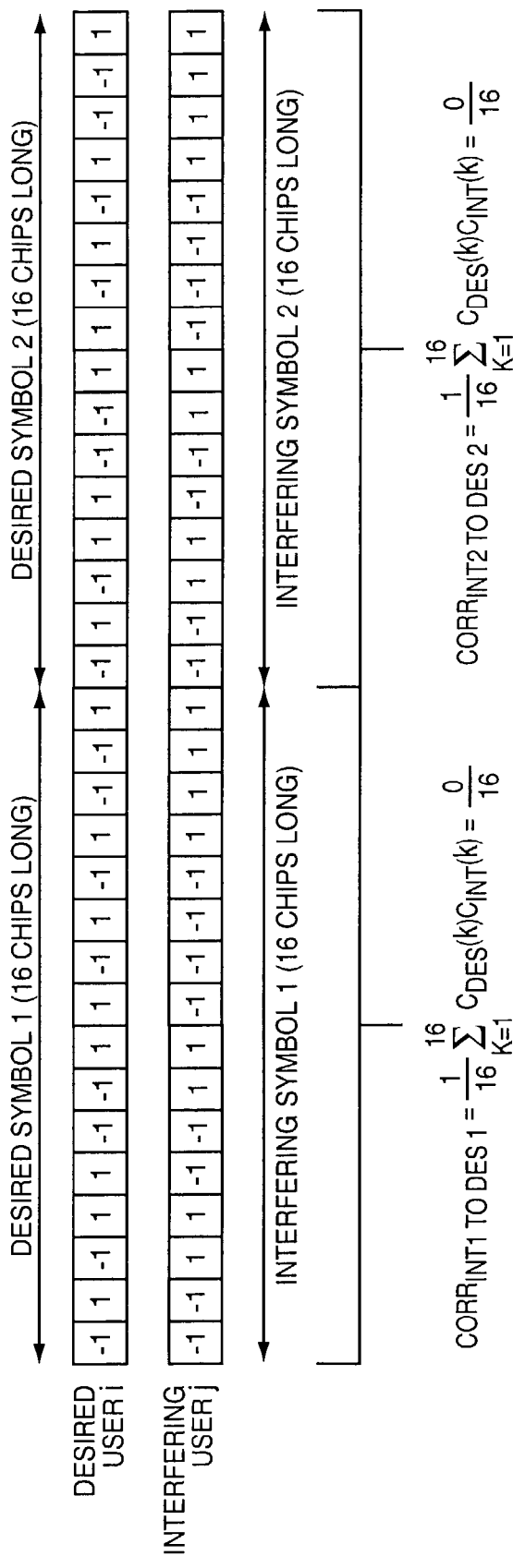

FIG. 11B helps to illustrate why the short code is important for the symbolrate PIC invention. Here is a scenario where there is an interfering and desired user. They are aligned in time and they both have a spreading factor of 16, which is the same as the length of the short code (16 chips). Shown are two symbols' worth of code for both the desired and interfering user. Only the code is shown—not the influence of the data symbol spread by this code. Further, the codes shown in the example are real, although in most systems this code would consist of complex values. Note that the code repeats itself for both symbols. The computation of the correlation, corr, between the two users' codes is also shown. Since the codes repeat themselves and are periodic, the correlation between the two users' codes also repeats and is periodic. Accordingly, the correlation calculation only has to be computed once and can be reused over many symbols in the invention.

Figure 11C:
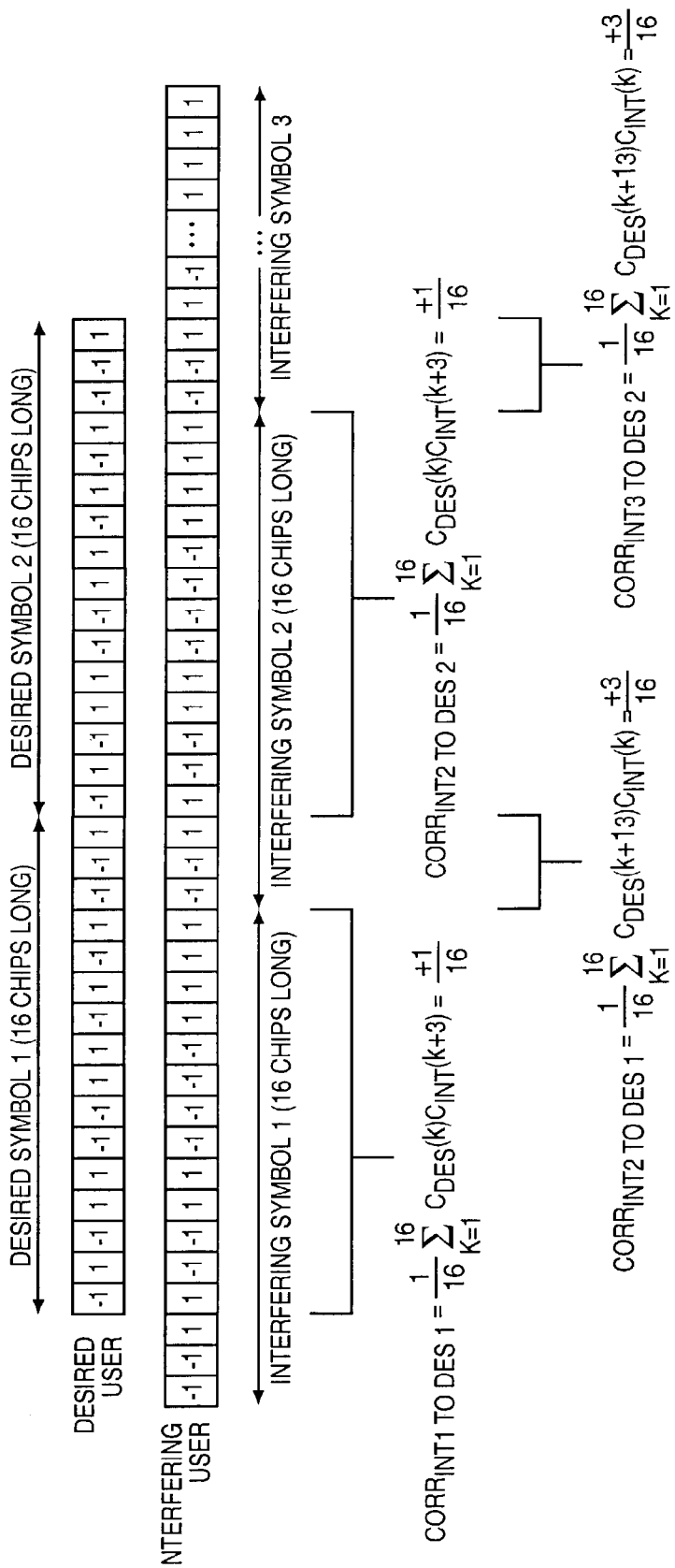

FIG. 11C takes the example one step further. Here, the desired and interfering user are offset in time with respect to each other by three chips. Now for each desired user symbol there are two interfering symbols. Symbols 1 and 2 of the interferer overlap symbol 1 of the desired user. The correlations of the respective parts of the code of the interfering symbols that overlap the desired user symbol are shown. Two important points arise. First, now that the delays of the users have changed, the correlations have also changed. Second, the correlations are still periodic. The correlation of interfering symbol 1 on desired symbol 1 is the same as the correlation of interfering symbol 2 on desired symbol 2. Likewise, the correlation of interfering symbol 2 on desired symbol 1 is the same as the correlation of interfering symbol 3 on desired symbol 2. This is only possible because the code is a short code and thus repeats. With long codes, the correlation between interfering and desired user symbols changes from symbol to symbol and therefore it would have to be calculated for each and every symbol.

Figure 11D:
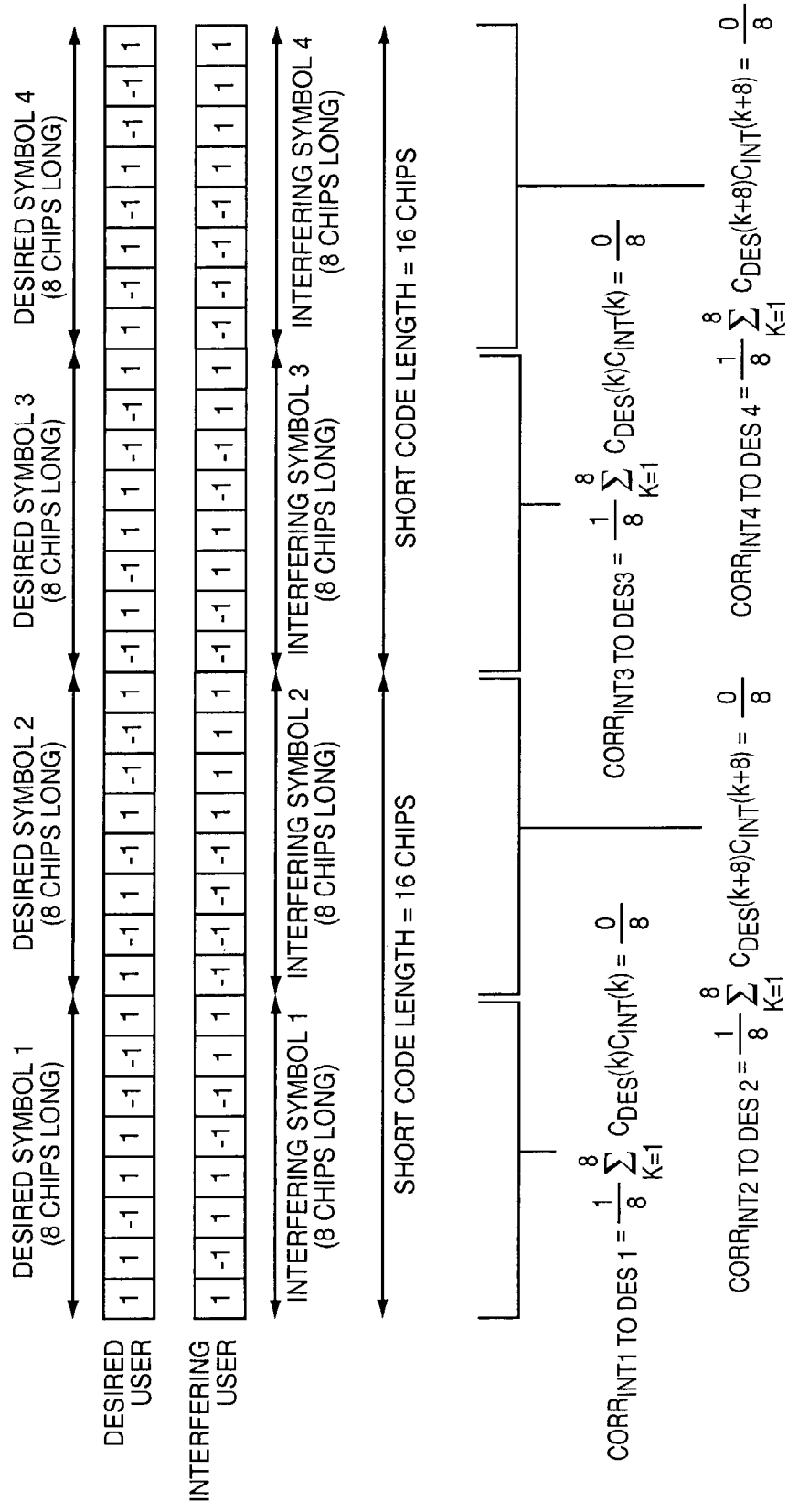

In the two previous scenarios, the spreading factors (SF) of the interfering and desired user were equal to the length of the short code, or 16. FIG. 11D extends the previous examples to the situation where the users still have an equal spreading factor but the spreading factor is smaller than the length of the short code. The spreading factor of both users is 8 chips, with the length of the short code equal to 16 chips. Since the users are aligned and they have the same spreading factor, there is only one interfering symbol that overlaps each desired user symbol. The correlations of these interfering symbols on the desired user symbols are shown. The correlation of interfering symbol 1 on desired symbol 1 is now different than the correlation of interfering symbol 2 on desired symbol 2. Although in this example they coincidentally have the same value, they are obviously derived from different code segments and so in the general case they would have different values. The difference in correlations comes from the fact that the code is different in the first symbol than in the second symbol. Since both the desired and interfering users have a spreading factor less than the short code length, both have a different code segment for the first symbol and the second symbol. The third symbol and the first symbol, however, share the same code due to the periodicity of the code of 16 chips. Likewise, the fourth and second symbols of each user share the same code, again due to the periodic nature of the code. The net result is that the correlations of the odd symbols, i.e. symbols 1, 3, 5, . . . , are equal and the correlations of the even symbols, i.e. symbols 0, 2, 4, . . . , are equal. The correlations are still periodic, therefore, but only over the length of the short code, in this case 16 chips. In general, if the length of the signature sequence is M, and the spreading factor of the users is SF, then the correlations repeat every (M/SF) correlation values. Note that when the users are not aligned, this periodicity of the correlations is still valid, it is just that now correlations of two interfering symbols must be calculated for every desired user symbol. This case is something that someone skilled in the art should appreciate as a natural extension of the invention.

Figure 11E:
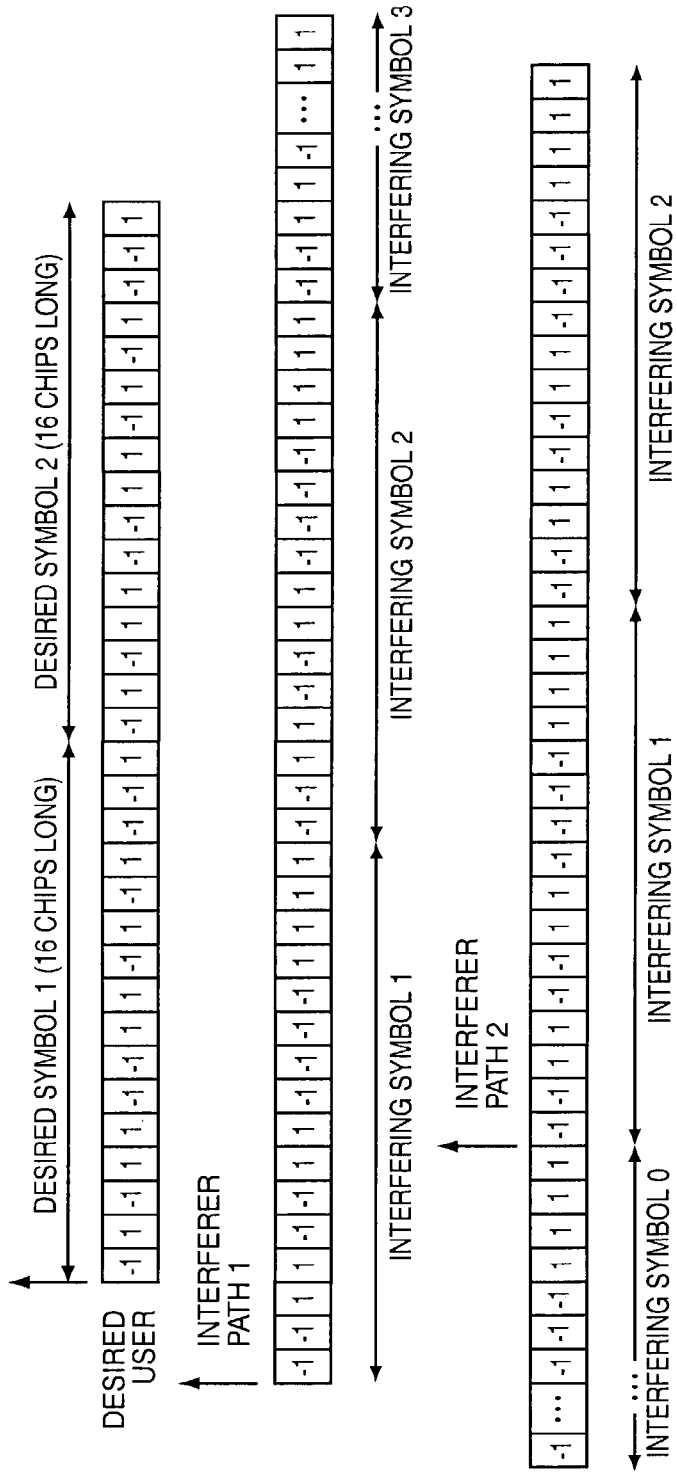

The previous examples have shown that when an interfering user and desired user are not aligned, two symbols of the interferer overlap, and therefore, interfere with each desired user symbol where all users have the same spreading factor. The invention description has shown that correlations and the corresponding interference contribution terms that follow must be calculated for the current, previous, and next symbols. FIG. 11E illustrates a desired and interfering users' signals wherein the desired user's signal travels through a single path and the interfering user's signal propagates through two paths. The delays of the paths of the interfering user are such that the first path has less delay than the path of the desired user, and the second path has more delay than the path of the desired user. In this scenario, three symbols of the interfering user now overlap each desired user symbol—these three symbols are the current, previous and next symbols of the interferer and lead to the respective correlation values. When the PIC operation comes after the MRC step of rake demodulation, the MRC output from which the interference is removed is a value containing the combined desired signal and interference from all of the fingers. Some of the interfering fingers may have less delay than the desired user's finger, and other interfering fingers may have more delay than the desired user's finger. Accordingly, the MRC output may be affected by the current, previous, and next symbols of an interfering user.

Figure 11F:
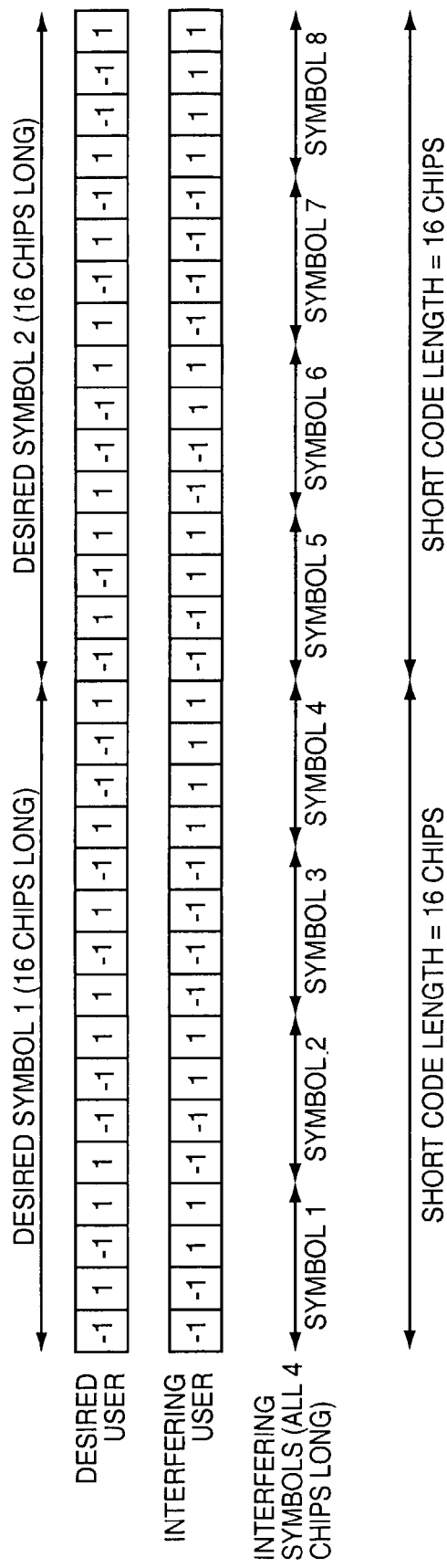
Figure 11G:
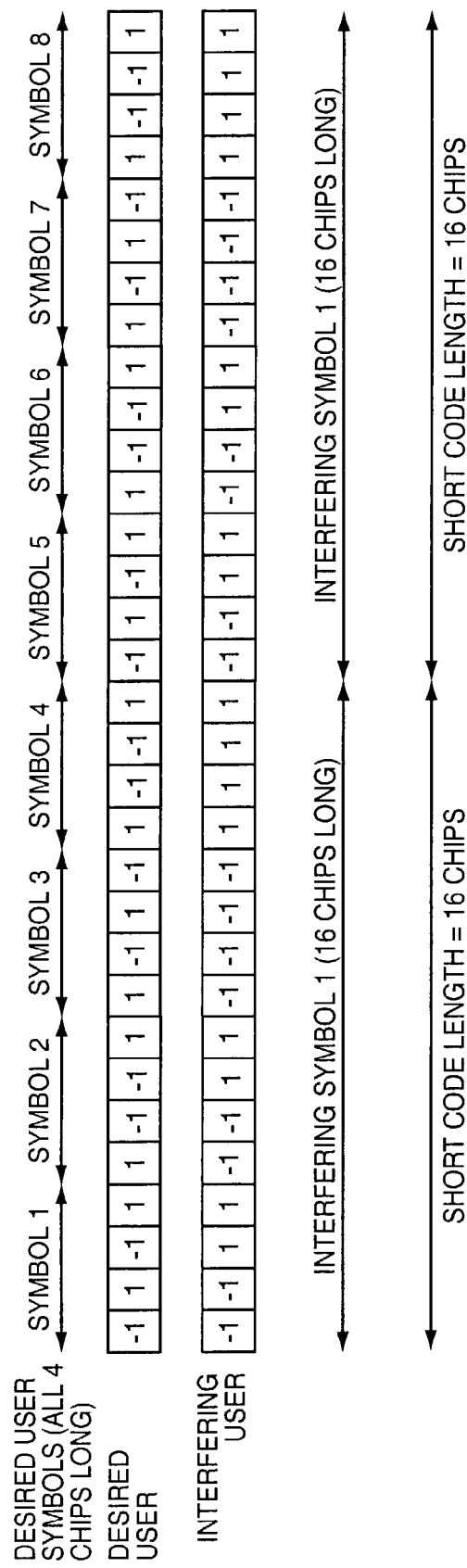

The examples to this point have all had the interfering and desired users with the same spreading factor. This is referred to as the uniform spreading factor case. In a real system, of course, different users may have different spreading factors. This is referred to as a mixed spreading factor case. FIGS. 11F and 11G provide two exemplary scenarios. In FIG. 11F, the desired user has a spreading factor larger than the interfering user. Here the desired user has a spreading factor of 16, while the interfering user has a spreading factor of 4. Now, more than three symbols of the interfering user affect each desired symbol. In other words, more than just the current, previous, and next symbols of the interfering user impact each desired user symbol. With the users aligned, four symbols of the interfering user overlap each desired user symbol. Therefore, there needs to be four correlation terms. These four correlation terms are periodic in that they are still applicable in the next 16-chip period, where 16 is also the length of the short code. In the scenario of FIG. 11G, the interfering user has the larger spreading factor. Here, it is possible that only part of an interfering symbol will impact a given desired symbol, and this interfering symbol may affect several desired user symbols. In the example shown, each interfering symbol overlaps four desired user symbols.

A person skilled in the art will appreciate that the invention still applies to the mixed spreading factor case. All of the steps of the invention still apply: (a) computing cross-correlations between the interfering and desired user codes (over the length of the short code), (b) incorporating the channel estimates of the interferer, (c) applying the combining weights of the rake combining to derive the interference contribution terms, (d) performing symbol decisions at the output of each iteration and then combining these symbol decisions with the interference contribution terms to regenerate the total interference, and finally (e) performing the subtraction of the interference.

Figure 11H:
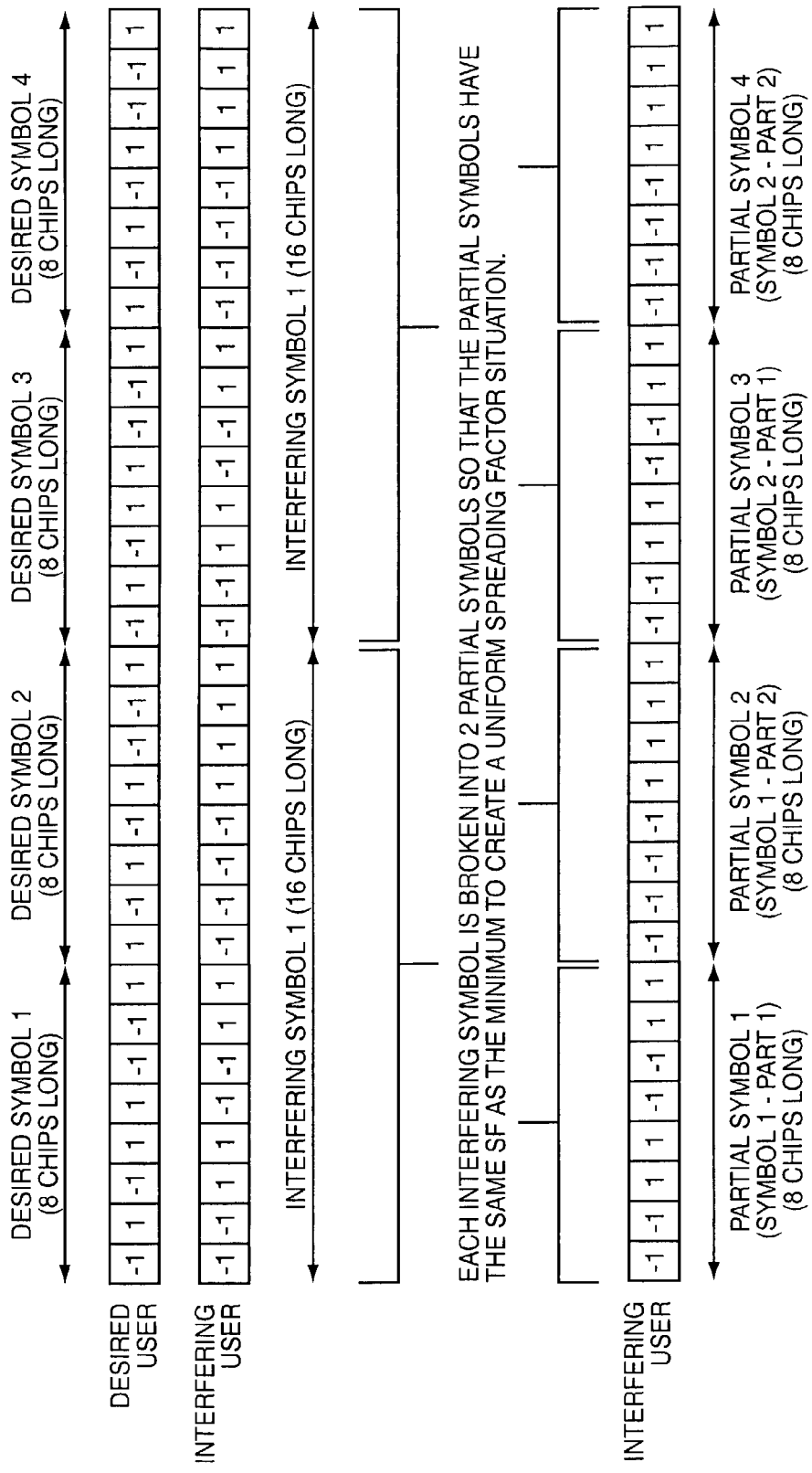

There are two possible approaches to accommodate the mixed spreading factor. The first is to do all of the information management necessary to keep track of exactly which set of symbols of the interfering user affect each desired symbol and calculating the appropriate cross-correlations and interference contribution terms. Such management must account for the fact that there may be many combinations of different users with different spreading factors. A second approach, which is more straightforward, is to determine the minimum spreading factor of all of the users and then consider all of the other users' symbols as broken-down symbols, or partial symbols, with the same spreading factor as this minimum spreading factor. FIG. 11H illustrates this technique wherein the desired user has a spreading factor of 8, while the interfering user has a spreading factor of 16. After making a symbol decision for the interfering user at the completion of each iteration, the 16 chips of the interfering code are thought of as two symbols worth of codes, each 8 chips in length. For the purposes of computing cross-correlations and interference contribution terms, these 8-chip segments are treated as two distinct interfering symbols, even though the same symbol value will be used for these two "symbols" when the symbol values are combined with the interference contribution terms. The problem has now been resolved into a uniform spreading factor problem and now only the current, previous, and next "symbols", or partial symbols as they may be referred to, interfere with a given desired user symbol. When it comes time to make a new symbol decision for a user whose symbols have been broken down into these partial symbols, all of the partial symbols are summed together to form the new symbol decision.

Figure 11I:
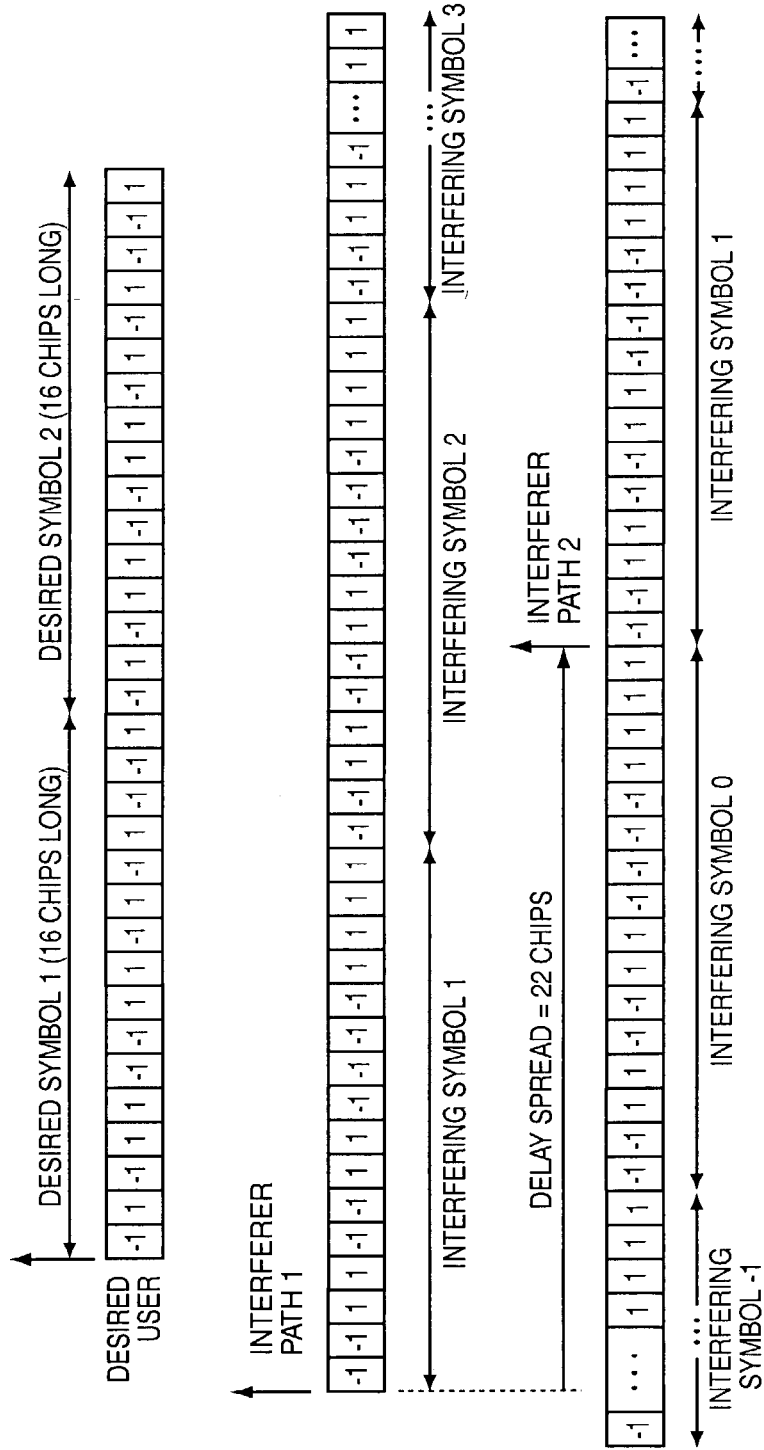

Much of the previous discussion has assumed that the delay spread of the channel is less than one symbol; however, a delay spread greater than one symbol is accommodated by the invention. FIG. 11I illustrates such a situation. When the delay spread of the channel is greater than the duration of one symbol, it is possible that more than just the previous, current, and next symbols of an interferer affect each desired user symbol. In this scenario, the interferer has two paths that are separated by some assumed maximum delay spread, which is here assumed to be 22 chips (which is greater than one symbol of 16 chips). The desired user is shown as having a single path. In this case, more than just three symbols of the interfering user overlap each desired user symbol. In this example, four symbols of the interferer overlap, and therefore, impact each desired user symbol. Here, interfering symbols—1, 0, 1, and 2, overlap desired symbol 1. This increase in the number of interfering symbols to each desired symbol implies a respective increase in the number of cross-correlation and interference contribution terms. However, the fundamental concepts of the invention remain. The correlation and interference contribution terms are still periodic over the length of the short code and they are still computed and applied in the same way.

Practically, an embodiment of the invention will assume some maximum delay spread and determine the interference contribution terms from the respective number of symbols, which also depends on the spreading factor. Usually the strength of very late multipaths are much weaker than the early paths, and often very late paths, which imply a large delay spread, may be ignored with little effect on performance. Effectively, these ignored paths become un-modeled interference.

Since the PIC process becomes more accurate with the number of iterations and the early iterations often provide hard symbol decisions that are inaccurate, the performance of the present PIC system can be enhanced by taking into consideration the hard decisions from previous iterations of a given PIC process for a given symbol. This process is generally referred to as interstage combining, and a symbol rate PIC architecture implementing interstage combining according to the present invention is illustrated in FIG. 12. The regeneration function 72 is provided with softened symbol decisions, which are based in part on previous hard symbol decisions from earlier iterations instead of being provided the hard symbol decisions from the previous iteration directly. In particular, the hard symbol decisions are filtered using a filter with fixed coefficients for each iteration, giving essentially a time-varying finite impulse response (FIR) filter whose coefficients may be obtained from a lookup table indexed by the iteration number. The blocks holding the hard symbol decisions $d_i^{(n-1)}$ through $d^{i(n-6)}$ represent stored hard symbol decisions from previous iterations, which are multiplied by corresponding filter coefficients $\gamma_n^{(n)}$ through $\gamma_{n-5}^{(n)}$. For each interfering user, these previous hard symbol decisions are multiplied by the corresponding filter coefficient via multiplication functions $80_2$ and $80_3$, wherein the results are summed together via summing functions $82_2$ and $82_3$ to provide softened symbol decisions $b_2$, $b_3$, which are fed into the regeneration function 72 as described in association with FIG. 10.

During the $n^{th}$ PIC iteration, the softened symbol estimates for the previous, current, and next symbols $b_{i,prev}^{(n)}$, $b_{i,curr}^{(n)}$, $b_{i,next}^{(n)}$ obtained from the previous iteration of the algorithm are used in recreation of the total interference $I_i^{(n)}$ to User i. The assumption here is that the delay spread generates interference limited to one symbol period on either side of the desired symbol—a simplifying assumption, but not one limiting applicability of the results. Filtering of each hard symbol estimate $d_j$ may be performed according to the exemplary input-output equations of Table 1.

TABLE 1

Input-output equations for interstage filter.
Example Input/Output Equations for Interstage Filtering

| | |
|---|---|
| First Iteration: | $b_j^{(0)} = \gamma_1^{(1)} d_j^{(0)}$ |
| Second Iteration: | $b_j^{(1)} = \gamma_2^{(2)} d_j^{(1)} + \gamma_1^{(2)} d_j^{(0)}$ |
| Third Iteration: | $b_j^{(2)} = \gamma_3^{(3)} d_j^{(2)} + \gamma_2^{(3)} d_j^{(1)} + \gamma_1^{(3)} d_j^{(0)}$ |
| Fourth Iteration: | $b_j^{(3)} = \gamma_4^{(4)} d_j^{(3)} + \gamma_3^{(4)} d_j^{(2)} + \gamma_2^{(4)} d_j^{(1)} + \gamma_1^{(4)} d_j^{(0)}$ |
| Fifth Iteration: | $b_j^{(4)} = \gamma_5^{(5)} d_j^{(4)} + \gamma_4^{(5)} d_j^{(3)} + \gamma_3^{(5)} d_j^{(2)} + \gamma_2^{(5)} d_j^{(1)} + \gamma_1^{(5)} d_j^{(0)}$ |
| Sixth Iteration: | $b_j^{(5)} = \gamma_6^{(6)} d_j^{(5)} + \gamma_5^{(6)} d_j^{(4)} + \gamma_4^{(6)} d_j^{(3)} + \gamma_3^{(6)} d_j^{(2)} + \gamma_2^{(6)} d_j^{(1)}$ |

Each soft symbol estimate $b_j$ is expressed as a function of a PIC iteration index, where each set of coefficients are potentially different during each iteration. Note that for each successive iteration the number of non-zero terms increases, as symbol estimates are accumulated for filtering. At some point, the length of the filter is reached, and the oldest symbol estimates drop out. This occurs in the sixth iteration for the given example, where $d_{j,curr}^{(0)}$, is not used, but $d^{j,curr(1)}$ through $d_{j,curr}^{(5)}$ are used. The coefficients $\gamma_i^{(n)}$ are fixed positive real numbers, with the guideline that $$\sum_{s=1}^{n} \gamma_s^{(n)} \leq 1.$$

In general, performance is seen to show a significant improvement when filtering is applied to the data estimates from several previous algorithm iterations.

As will be recognized by those skilled in the art, the specific number of taps and the specific coefficients are parameters which can be optimized during design. It should be stressed that for a fixed set of coefficients, the performance improvement is significant as compared with generic PIC with no interstage filtering. A person skilled in the art will appreciate that there are other forms of multistage interference cancellation where symbol decisions are made each iteration and then used to regenerate an estimate of interference. In these other forms of interference cancellation, interstage combining of symbol decisions is possible. Further, interstage combining can be used on soft symbol decisions with respect to the resultant interference estimates.

Tuning of the coefficients is generally made during the design and simulation stage. It is possible to optimize coefficients for any particular channel model, but a set of coefficients that performs well for a class of channels can be found. A starting point for coefficient optimization is described in Table 2, where symbol estimates from the oldest iteration are successively further weighted by one-half in the filter. It should be noted that these coefficients are starting values, and performance can still be improved by tuning and optimization for the particular channel conditions expected.

TABLE 2

Coefficient generation scheme for interstage filter.

| | |
|---|---|
| First Iteration: | Take $\gamma_1^{(1)} \leq 1$. |
| Second Iteration: | Take $\gamma_2^{(2)} = 0.5$ and $\gamma_1^{(2)} = 0.5$. |
| Third Iteration: | Take $\gamma_3^{(3)} = 0.5$, $\gamma_2^{(3)} = 0.25$, and $\gamma_1^{(3)} = 0.25$. |
| Fourth Iteration: | Take $\gamma_4^{(4)} = 0.5$, $\gamma_3^{(4)} = 0.25$, $\gamma_2^{(4)} = 0.125$, and $\gamma_1^{(4)} = 0.125$. |
| Fifth Iteration: | Take $\gamma_5^{(5)} = 0.5$, $\gamma_4^{(5)} = 0.25$, $\gamma_3^{(5)} = 0.125$, $\gamma_2^{(5)} = 0.0625$, and $\gamma_1^{(5)} = 0.0625$. |

Sixth Iteration: Take $\gamma_6^{(6)}=0.5$, $\gamma_5^{(6)}=0.25$, $\gamma_4^{(6)}=0.125$, $\gamma_3^{(6)}=0.0625$, $\gamma_2^{(6)}=0.0625$, and $\gamma_1^{(6)}=0$ Notice that for the sixth iteration and further, the coefficients may still change, even though the filter remains at the same size. This flexibility is provided because the cancellation process is at stages closer to convergence where older data estimates may be weighted weaker to stress the more reliable recent stage data estimates.

It has been found that mid-way through the cancellation stages, an improvement occurs when the filter is 'flushed' of the older estimates. This is accomplished, for example at Stage 5, by setting coefficients:

Fifth Iteration Take $\gamma_5^{(5)}=1.0$, $\gamma_4^{(5)}=0.0$, $\gamma_3^{(5)}=0.0$, $\gamma_2^{(5)}=0.0$, and $\gamma_1^{(5)}=0.0$.

Then setting the Stage 6 coefficients back to the Stage 2 values,

Sixth Iteration Take $\gamma_5^{(6)}=0.5$, $\gamma_4^{(6)}=0.5$, $\gamma_3^{(6)}=0.0$, $\gamma_2^{(6)}=0.0$, and $\gamma_1^{(6)}=0.0$.

and so on.

There are two alternative implementations of the interstage filter. The first incorporates direct filtering of data estimates. In FIG. 12, the filter is depicted where hard symbol estimates $d_j^{(n)}$ are filtered, producing softened symbol decisions $b_j^{(n)}$. QPSK symbols are symbols having two logical bits. Estimates of interference between users is calculated using softened symbol decisions according to:

$$I_i^{(n)}=I_{i,curr}b_{j,curr}^{(n-1)}+I_{i,prev}b_{j,prev}^{n-1}+I_{i,next}b_{j,next}^{n-1}.$$

The vectors in $I_{i,total}^{(k)}(m)$ are defined to be $$I_{i,curr}=[I_{i,j,curr}I_{i,2,curr}\ldots I_{i,N,curr}]$$

$$I_{i,prev}=[I_{i,j,prev}I_{i,2,prev}\ldots I_{i,N,prev}]$$

$$I_{i,next}=[I_{i,j,next}I_{i,2,next}\ldots I_{i,N,next}]$$

$$b^{(n)}(m)=[b_1^{(n)}(m)b_2^{(n)}(m)\ldots b_N^{(n)}(m).]$$

where N is the number of interferers, n is the iteration index, and m is a symbol index. Although this example relates to symbol rate PIC, such filtering of data estimates is equally applicable to chip rate PIC, as shown in FIG. 13. In the PIC-based system of FIG. 13, the interference terms for each user would be further spread by the appropriate signature sequence for each user prior to being combined to generate the total interference to User 1. The generation of the softened symbol decisions is the same as that for the symbol rate PIC of FIG. 12. Notably, interstage combining can be applied to forms of PIC other than the most well-known chip and symbol rate PIC.

The second embodiment incorporates direct filtering of interference estimates. In FIG. 14, the time varying finite impulse response filtering is instead applied to the regenerated interference estimates based on the unfiltered hard symbol estimates $d_j^{(n)}$. The unfiltered interference estimate for each iteration n is represented by:

$$I_{i,UNFIL}^{(n)}=I_{i,j,curr}d_{j,curr}+I_{i,j,prev}d_{j,prev}+I_{i,j,next}d_{j,next}.$$

The vectors in $I_{i,UNFIL}^{(n)}$ are defined as previously, with the addition of $$d^{(n)}=[d_1^{(n)}d_2^{(n)}\ldots d_N^{(n)}].$$

The filtered interference estimates $I_i^{(n)}$ represent the total interference and are represented by:

$$I_i^{(n)}=\gamma_n^{(n)}I_i^{(n)}+$$

$$\ldots$$

$$+\gamma_3^{(n)}I_i^{(3)}+\gamma_2^{(n)}I_i^{(2)}+\gamma_1^{(n)}I_i^{(1)}$$

Filtering here is performed on interference estimates rather than hard symbol decisions. This simplifies the implementation as compared to filtering hard symbol decisions, as only the aggregated interference term is filtered, rather than the hard symbol decisions. In particular, unfiltered interference estimates $I_{i,UNFIL}^{(n-1)}$ through $I_{i,UNFIL}^{(n-6)}$ are multiplied by the corresponding filter coefficients, $\gamma_u^{(n)}$ through $\gamma_{n-5}^{(n)}$, by multiplication functions 84, and the results are combined with summing function 86 to arrive at the total interference term $I_i^{(n)}$. This is possible because of linearity of the interference calculation for $I_i^{(n)}$ with respect to the hard symbol estimates, and because all symbols are filtered using the same coefficients for the same iteration. This filtering of interference estimates is most applicable to symbol rate PIC. From a system performance perspective, the two embodiments of the interstage combining are equivalent. Implementation particulars (i.e. chip versus symbol rate processing) may cause one technique to be favored over the other.

Regenerated interference is based on hard symbol decisions. Typical complexity estimates are given in Table 3 for interstage combining filtering of interference terms (as shown in FIG. 13). One way to interpret the interstage combining filtering is that it softens the hard decisions allowing the system to attain the good performance of a soft decision system but with the low complexity of hard decisions. Most importantly, because hard symbol decisions are used for interference regeneration, the complexity in an implementation is very modest as compared with using soft symbol decisions. This is because the hard QPSK symbol multiplied with a complex number is accomplished by complementing and/or swapping the in-phase and quadrature samples. This is typically modeled as two real additions in hardware. This special operation is counted separately, and is labeled a QMAC (QPSK multiply and accumulate) in Table 3. As a contrast, when using soft data estimates, real and complex quantities are multiplied, involving two real multiplies.

TABLE 3

Complexity estimate per symbol for N users.

| Iteration # | QMACs per Symbol | Real Additions per Symbol | Real Multiplies per Symbol |
|---|---|---|---|
| 1 | $3N^2$ | 0 + 2N | 2N |
| 2 | $3N^2$ | 2N + 2N | 4N |
| 3 | $3N^2$ | 4N + 2N | 6N |
| 4 | $3N^2$ | 6N + 2N | 8N |
| 5 | $3N^2$ | 8N + 2N | 10N |
| 6 | $3N^2$ | 10N + 2N | 12N |

Complexity is related to iteration number in Table 3 because the interstage combining filter grows in length with the number of iterations. The additional complexity per iteration maximizes at the sixth iteration when, in this example, the memory of the filter is reached and the filter is full of interstage results. The "Real Additions" column contains a fixed component of 2N reflecting the final subtraction used in each stage of cancellation where a complex subtraction is implemented as two real additions. The other entries in Table 3 represent complexities due to interstage combining filtering of interference for N users.

Numerical results for a UMTS-TDD example are shown in Table 5, where system parameters are listed in Table 4. The interpretation of the complexity quantities is made when compared with conventional receiver complexity for a four finger rake in Table 6. The numbers give the ratio of complexity increase for the interference cancellation receiver when using interstage combining, and demonstrate that implementing PIC requires a modest increase in complexity as compared with the conventional rake receiver, and is essentially proportional to the number of iterations performed. Note that the absolute complexity of the interference cancellation scheme would also include the rake receiver numbers, as they are required for the first stage data estimates.

TABLE 4

Complexity estimate parameters.

| Parameter | Symbol | Value |
|---|---|---|
| Number of Users | N | 16 |
| Symbol Rate (symbols per second) | $R_S$ | 183,000 |
| Number of RAKE fingers |  | 4 |

TABLE 5

Complexity breakdown of interference regeneration and cancellation using interstage combining in terms of real multiplies, QMACs, and real additions, and conventional rake receiver.

| Module/Operation | Number of Real Multiplies (billions per second) | Number of QMACs (billions per second) | Number of Real Additions (billions per second) |
|---|---|---|---|
| Generation of Total Interference |  |  |  |
| Iteration 1 | 0.006 | 0.141 | 0.000 |
| Iteration 2 (cumulative) | 0.018 | 0.281 | 0.006 |
| Iteration 3 (cumulative) | 0.035 | 0.422 | 0.018 |
| Iteration 4 (cumulative) | 0.059 | 0.562 | 0.035 |
| Iteration 5 (cumulative) | 0.082 | 0.703 | 0.053 |
| Iteration 6 (cumulative) | 0.105 | 0.843 | 0.070 |
| Iteration 7 (cumulative) | 0.129 | 0.984 | 0.088 |
| Iteration 8 (cumulative) | 0.152 | 1.124 | 0.105 |
| Subtraction of Interference |  |  |  |
| Iteration 1 | 0.000 | 0.000 | 0.006 |
| Iteration 2 (cumulative) | 0.000 | 0.000 | 0.012 |
| Iteration 3 (cumulative) | 0.000 | 0.000 | 0.018 |
| Iteration 4 (cumulative) | 0.000 | 0.000 | 0.023 |
| Iteration 5 (cumulative) | 0.000 | 0.000 | 0.029 |
| Iteration 6 (cumulative) | 0.000 | 0.000 | 0.035 |
| Iteration 7 (cumulative) | 0.000 | 0.000 | 0.041 |
| Iteration 8 (cumulative) | 0.000 | 0.000 | 0.047 |
| RAKE Receiver | 0.048 | 0.187 | 0.041 |

TABLE 6

Relative complexity increase of regeneration and cancellation with interstage combining as compared with baseline rake receiver in terms of real multiplies, QMACs, and real additions.

| Iteration # | Real Multiples normalized to RAKE | QMACs normalized to RAKE | Real Additions normalized to RAKE |
| --- | --- | --- | --- |
| 4 | 1.23 | 3.00 | 1.42 |
| 8 | 3.17 | 6.01 | 3.71 |

PIC may be implemented in hardware, software, DSPs, ASICs, FPGAs, or reconfigurable logic. Interstage filtering is amenable to all platforms. In a hardware implementation, either hard symbol estimates or regenerated interference estimates would be stored in arrays of memory, and the coefficients are stored possibly in programmable registers. The coefficient registers are programmable from the partner DSP or microcontroller, and the PIC can essentially be customized by choice of the programmable coefficients. The filtering would occur when the weighted sum of the in-phase and quadrature data elements are made, with the weighting determined by the coefficient registers. This could be heavily parallelized for calculating PIC stages of several symbols simultaneously. In software, the hard data estimates or regenerated interference estimates are stored in in-phase and quadrature arrays, and again weighted sums are computed using stored arrays of filter coefficients. These implementations are only given as examples, as the nature of this invention is not dependent on any particular hardware or software implementation.

The concepts of the present invention may be applied to receivers using multiple antennas to obtain spatial diversity. FIG. 15 provides a logical overview of the application of the invention to a receiver architecture having multiple antennas, such as a main antenna $26_M$ and at least one diversity antenna $26_D$. Notably, only aspects of rake demodulation and interference cancellation for a User i are illustrated; however, the process will be provided for each user. In this embodiment, the rake demodulation function $66_i$ for each User i will receive the received signals $60_M$ and $60_D$ from the main antenna $26_M$ and the diversity antenna(s) $26_D$, respectively. Further, the received signals $60_M$ and $60_D$ are also provided to channel estimation functions $64_M$ and $64_D$, respectively. The channel estimation functions $64_M$ and $64_D$ will provide the respective channel delays $\tau$ and channel estimates for User i to the rake demodulation function $66_i$ and the channel delays and channel estimates for User i and all interfering users to User F's regeneration function $72_i$.

Since the rake demodulation function $66_i$ has a limited number of fingers, it can only process a number of multipath signals for User i equal to the number of fingers. In spatial diversity applications, the same multipath signal received at the main antenna $26_M$ may be very strong while being very weak when received at the diversity antenna $26_D$. Thus, the received signal $60_M$ will contain multipath signals for User i that are relatively weaker or stronger than the same signals in the received signal $60_D$ from the diversity antenna(s) $26_D$. In operation, the present invention selects the strongest multipath signals received at either the main antenna $26_M$ or the diversity antennas $26_D$ and assigns the data in these signals to the various fingers based on their relative strengths.

If there are four fingers in the rake demodulation function $66_i$, the four strongest multipath signals from either the main antenna $26_M$ or the diversity antennas $26_D$ are assigned to the fingers. Thus, three strong multipath signals on the main antenna $26_M$ may be assigned to fingers 1-3, while the fourth strongest multipath signal is received at diversity antenna $26_D$ and assigned to finger 4. Again, each finger representing a relative delay corresponds to the delay between the multipath signals based on channel delays $\tau$ received from the channel estimation functions $64_M$ and $64_D$. The output of the fingers, regardless of whether the data was received in the received signal $60_M$ from the main antenna $26_M$ or the received signal $60_D$ from the diversity antenna $26_D$, are combined using maximum ratio combining in traditional fashion to provide an $MRC_i$ output, which is used by the PIC function $68_i$ as described above. In an iterative fashion, the total interference from the interfering users, $I_i$, is subtracted from the $MRC_i$ output to provide soft outputs $Y_i^{(n)}$, and is provided to the symbol decision function $70_i$ to obtain hard symbol decisions $d_i^{(n)}$.

The diversity embodiment of the present invention individually calculates interference contribution terms for each of the main and diversity antennas $26_M$ and $26_D$ based on channel delays $\tau$ and channel estimates h provided by the respective channel estimation functions $64_M$ and $64_D$ for the main and diversity antennas $26_M$ and $26_D$. The interference contribution terms for the main antenna $26_M$ are calculated as described in reference to FIG. 11 to arrive at an intermediate interference contribution term $I_M$ for the current, previous, and next symbols of the interfering User j. Similarly, an intermediate interference contribution term $I_D$ is calculated for each diversity antenna $26_D$ for the current, previous, and next symbols of the interfering User j, again without influence from signals received from the other antennas (e.g. the main antenna $26_M$). The intermediate interference contribution terms $I_M$ and $I_D$ are simply summed together to arrive at the interference contribution terms $I_{i,j,current}$, $I_{i,j,previous}$, and $I_{i,j,next}$, which are used to estimate the total interference to User i based on hard or softened symbol decisions fed back from previous iterations as described above in the embodiments with or without interstage combining.

The resulting total interference $I_i$ from the interfering users is iteratively subtracted from the $MRC_i$ output at the PIC function $68_i$ to provide the outputs which are sent to the symbol decision function $70_i$. Again, computation complexity is significantly reduced by only needing to calculate the interference contribution terms $I_{i,j,current}$, $I_{i,j,previous}$, and $I_{i,j,next}$ when channel conditions change, which may encompass over 100 received symbols. Further, the intermediate interference contribution terms are easily summed together to form the actual interference contribution terms in an infrequent and computationally efficient manner.

For further detail regarding PIC, reference is made to U.S. patent application Ser. No. 10/001,877, entitled TIME VARIANT FILTER IMPLEMENTATION and filed Nov. 16, 2001, and U.S. patent application Ser. No. 09/998,564, entitled SYMBOL-DIRECTED WEIGHTING IN PARALLEL INTERFERENCE CANCELLATION and filed Nov. 16, 2001, which are incorporated herein by reference. For further detail regarding multi-user detection techniques, reference is made to U.S. patent application Ser. No. 09/950,776, entitled MULTI-USER DETECTION IN CDMA COMMUNICATIONS SYSTEM and filed Sep. 12, 2001, which is incorporated herein by reference.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   a) determining interference contribution terms representing interference contributions of each interfering user on a select user, the interference contribution terms independent of data symbols of the interfering users and select user; and
   b) providing parallel interference cancellation on each of a plurality of signal segments recovered for the select user by iteratively:
      i) processing symbol estimates for each interfering user based on corresponding ones of the interference contribution terms to provide individual interference estimates;
      ii) summing the individual interference estimates to generate a total interference; and
      iii) subtracting the total interference from a signal segment of the plurality of signal segments to provide an improved output, the interference contribution terms remaining constant during the parallel interference cancellation for the plurality of signal segments, wherein the interference contribution terms are each a function of cross-correlations of signature sequences for each interfering user and the select user at a plurality of offsets corresponding to channel delays for multipath signals of the interfering and select users in light of channel estimates associated with each multipath signal.

2. The method of claim 1 wherein the interference contribution terms are functions of the channel delays and channel estimates for each multipath signal and not an overall channel impulse response.

3. The method of claim 1 wherein the cross-correlations of the signature sequences are updated at a first rate based on changes in the channel delays, and the channel estimates are updated at a second rate based on changes in channel conditions such that the interference contribution terms are updated when either the channel delays and/or channel estimates are updated.

4. The method of claim 1 further comprising determining the channel delays and channel estimates based on recovering pilot signals or midambles of the interfering and select users.

5. A method comprising:
   a) determining interference contribution terms representing interference contributions of each interfering user on a select user, the interference contribution terms independent of data symbols of the interfering users and select user; and
   b) providing parallel interference cancellation on each of a plurality of signal segments recovered for the select user by iteratively:
      i) processing symbol estimates for each interfering user based on corresponding ones of the interference contribution terms to provide individual interference estimates;
      ii) summing the individual interference estimates to generate a total interference; and
      iii) subtracting the total interference from a signal segment of the plurality of signal segments to provide an improved output, the interference contribution terms remaining constant during the parallel interference cancellation for the plurality of signal segments,
   the method further comprising providing rake demodulation by providing maximum ratio combining of rake finger outputs for the select user to provide the signal segment on a received signal for the select user, wherein the parallel interference cancellation occurs at a symbol rate on the signal segment for the select user.

6. The method of claim 5 wherein the information for the interfering users and the select user is originally spread using short codes.

7. The method of claim 5 wherein:
   a) the determining step further comprises determining current, previous, and next interference contribution terms representing interference contributions of each current, previous, and next symbol of each interfering user on a current symbol of the select user;
   b) the processing step further comprises processing current, previous, and next symbol estimates for each interfering user relative to the current symbol estimate of the select user based on corresponding ones of the current, previous, and next interference contribution terms to provide current, previous, and next individual interference estimates; and
   c) the summing step further comprises summing the current, previous, and next individual interference estimates for all of the interfering users to generate the total interference.

8. The method of claim 7 wherein the current, previous, and next interference contribution terms are each a function of cross-correlations of signature sequences for each interfering user and the select user at a plurality of offsets corresponding to channel delays for multipath signals of the interfering and select users in light of channel estimates associated with each multipath signal.

9. The method of claim 5 wherein the interference contribution terms remain constant during a plurality of parallel interference cancellation iterations for a given symbol.

10. The method of claim 5 further comprising making a hard symbol decision based on an improved output, the hard symbol decisions used for parallel interference cancellation for the interfering users.

11. The method of claim 5 wherein the symbol estimates for each interfering user are hard symbol decisions from parallel interference cancellation for the interfering users.

12. The method of claim 5 further comprising filtering hard symbol decisions from parallel interference cancellation iterations for the interfering users with a finite impulse response filtering function to generate the symbol estimates for each interfering user.

13. The method of claim 5 wherein the summing step further comprises:
   a) summing the individual interference estimates during each iteration to provided a total interference term; and
   b) filtering the total interference term from parallel interference cancellation iterations with a finite impulse response filtering function to generate the total interference.

14. The method, of claim 5 wherein interfering and user signals are received at a plurality of antennas and the determining step; further comprises determining for each of the plurality of antennas, antenna-specific interference contribution terms representing interference contributions of each interfering user on the select user based on signals received from the plurality of antennas and further comprising summing the antenna-specific interference contribution terms for each interfering user to provide the interference contribution terms for each interfering user.

15. The method of claim 14 further comprising assigning a plurality of the strongest multipath signals received from any of the plurality of antennas for the select user to a like plurality of rake fingers and providing rake demodulation on the plurality of strongest multipath signals to provide an output from which symbol estimates for the select user are based.

16. The method of claim 14 wherein:
a) the determining step further comprises determining current, previous, and next interference contribution terms representing interference contributions of each current, previous, and next symbol of each interfering user on a current symbol of the select user;
b) the processing step further comprises processing current, previous, and next symbol estimates for each interfering user relative to the current symbol estimate of the select user based on corresponding ones of the current, previous, and next interference contribution terms to provide current, previous, and next individual interference estimates; and
c) the summing step further comprises summing the current, previous, and next individual interference estimates for all of the interfering users to generate the total interference.

17. A receiver comprising receive circuitry and a processor, the processor adapted to:
a) determine interference contribution terms representing interference contributions of each interfering user on a select user, the interference contribution terms independent of data symbols of the interfering users and select user; and
b) provide parallel interference cancellation on each of a plurality of signal segments recovered for the select user by iteratively:
i) processing symbol estimates for each interfering user based on corresponding ones of the interference contribution terms to provide individual interference estimates;
ii) summing the individual interference estimates to generate a total interference; and
iii) subtracting the total interference from a signal segment of the plurality of signal segments to provide an improved output, the interference contribution terms remaining constant during the parallel interference cancellation for the plurality of signal segments, wherein the interference contribution terms are each a function of cross-correlations of signature sequences for each interfering user and the select user at a plurality of offsets corresponding to channel delays for multipath signals of the interfering and select users in light of channel estimates associated with each multipath signal.

18. The receiver of claim 17 wherein the interference contribution terms are functions of the channel delays and channel estimates for each multipath signal and not an overall channel impulse response.

19. The receiver of claim 17 wherein the cross-correlations of the signature sequences are updated at a first rate based on changes in the channel delays and the channel estimates are updated at a second rate based on changes in channel conditions such that, the interference contribution terms are updated when either the channel delays and/or channel estimates are updated.

20. The receiver of claim 17 wherein the processor is further adapted to determine the channel delays and channel estimates based on recovered pilot signals or midambles of the interfering and select users.

21. A receiver comprising received circuitry and a processor, the processor adapted to:
a) determine interference contribution terms representing interference contributions of each interfering user on a select user, the interference contribution terms independent of data symbols of the interfering users and select user; and
b) provide parallel interference cancellation on each of a plurality of signal segments recovered for the select user by iteratively:
i) processing symbol estimates for each interfering user based on corresponding ones of the interference contribution terms to provide individual interference estimates;
ii) summing the individual interference estimates to generate a total interference; and
iii) subtracting the total interference from a signal segment of the plurality of signal segments to provide an improved output, the interference contribution terms remaining constant during the parallel interference cancellation for the plurality of signal segments,
wherein the processor is further adapted to provide rake demodulation by providing maximum ratio combining of rake finger outputs for the select user to provide the signal segment on a received signal for the select user, wherein the parallel interference cancellation occurs at a symbol rate on the signal segment for the select user.

22. The receiver of claim 21 wherein the information for the interfering users and the select user is originally spread using short codes.

23. The receiver of claim 21 wherein the processor is further adapted to:
a) determine current, previous, and next interference contribution terms representing interference contributions of each current, previous, and next symbol of each interfering user on a current symbol of the select user;
b) process current, previous, and next symbol estimates for each interfering user relative to the current symbol estimate of the select user based on corresponding ones of the current, previous, and next interference contribution terms to provide current, previous, and next individual interference estimates; and
c) sum the current, previous, and next individual interference estimates for all of the interfering users to generate the total interference.

24. The receiver of claim 23 wherein the current, previous, and next interference contribution terms are each a function of cross-correlations of signature sequences for each interfering user and the select user at a plurality of offsets corresponding to channel delays for multipath signals of the interfering and select users in fight of channel estimates associated with each multipath signal.

25. The receiver of claim 21 wherein the in interference contribution terms remain constant during a plurality of parallel interference cancellation iterations for a given symbol.

26. The receiver of claim 21 wherein the processor is further adapted to make a hard symbol decision based on an improved output, the hard symbol decisions used for parallel interference cancellation for the interfering users.

27. The receiver of claim 21 wherein the symbol estimates for each interfering user are hard symbol decisions from parallel interference cancellation for the interfering users.

28. The receiver of claim 21 wherein the processor is further adapted to filter hard symbol decisions from parallel interference cancellation iterations for the interfering users with a finite impulse response filtering function to generate the symbol estimates for each interfering user.

29. The receiver of claim 21 wherein the processor is further adapted to:
   a) sum the individual interference estimates during each iteration to provided a total interference term; and
   b) filter the total interference term from parallel interference cancellation iterations with a finite impulse response filtering function to generate the total interference.

30. The receiver of claim 21 wherein interfering and user signals are received at a plurality of antennas and wherein the processor is further adapted to determine for each of the plurality of antennas, antenna-specific interference contribution terms representing interference contributions of each interfering user on the select user based on signals received from the plurality of antennas and sum the antenna-specific interference contribution terms for each interfering user to provide the interference contribution terms for each interfering user.

31. The receiver of claim 30 wherein the processor is further adapted to assign a plurality of the strongest multipath signals received from any of the plurality of antennas for the select user to a like plurality of rake fingers and providing rake demodulation on the plurality of strongest multipath signals to provide an output from which symbol estimates for the select user are based.

32. The receiver of claim 30 wherein the processor is further adapted to:
   a) determine current, previous, and next interference contribution terms representing interference contributions of each current, previous, and next symbol of each interfering user on a current symbol of the select user;
   b) process current, previous, and next symbol estimates for each interfering user relative to the current symbol estimate of the select user based on corresponding ones of the current, previous, and next interference contribution terms to provide current, previous, and next individual interference estimates; and
   c) sum the current, previous, and next individual interference estimates for all of the interfering users to generate the total interference.

* * * * *